United States Patent
Dmukhin et al.

(10) Patent No.: US 12,079,927 B2
(45) Date of Patent: Sep. 3, 2024

(54) LIGHT ESTIMATION USING NEURAL NETWORKS

(71) Applicant: Snap Inc., Santa Monica, CA (US)

(72) Inventors: Gleb Dmukhin, Kyiv (UA); Egor Nemchinov, London (GB); Yurii Volkov, Kyiv (UA)

(73) Assignee: Snap Inc., Santa Monica, CA (US)

( * ) Notice: Subject to any disclaimer, the term of this patent is extended or adjusted under 35 U.S.C. 154(b) by 160 days.

(21) Appl. No.: 17/506,248

(22) Filed: Oct. 20, 2021

(65) Prior Publication Data

US 2022/0207819 A1 Jun. 30, 2022

Related U.S. Application Data

(60) Provisional application No. 63/133,191, filed on Dec. 31, 2020.

(51) Int. Cl.
   *G06T 15/50*   (2011.01)
   *G06N 3/08*    (2023.01)
   *G06V 10/60*   (2022.01)

(52) U.S. Cl.
   CPC ............. *G06T 15/506* (2013.01); *G06N 3/08* (2013.01); *G06V 10/60* (2022.01)

(58) Field of Classification Search
   CPC ........ G06K 9/4661; G06N 3/08; G06N 3/045; G06N 3/0464; G06T 15/506; G06T 2207/10024; G06T 2207/20084; G06T 7/70; G06T 5/008; G06T 7/11; G06T 15/50; G06T 7/90; G06T 2207/20081; G06V 10/60; G06V 10/82; G06V 20/20
   See application file for complete search history.

(56) References Cited

U.S. PATENT DOCUMENTS

2021/0065440 A1* 3/2021 Sunkavalli ............... G06N 3/08

OTHER PUBLICATIONS

"International Application Serial No. PCT/US2021/064942, International Search Report mailed Apr. 22, 2022", 4 pgs.
"International Application Serial No. PCT/US2021/064942, Written Opinion mailed Apr. 22, 2022", 6 pgs.
Daquan, Liu, "ARShadowGAN: Shadow Generative Adversarial Network for Augmented Reality in Single Light Scenes", 2020 IEEE CVF Conference On Computer Vision and Pattern Recognition (CVPR), IEEE, (Jun. 13, 2020), 10 pgs.

(Continued)

*Primary Examiner* — Xilin Guo
(74) *Attorney, Agent, or Firm* — Schwegman Lundberg & Woessner, P.A.

(57) ABSTRACT

A messaging system performs image processing to estimate lighting properties with neural networks for images provided by users of the messaging system. A method of estimating light properties includes receiving an input image with first lighting properties and processing the input image using a convolutional neural network to generate an estimate of the first lighting properties. The method may further include modifying the input image with an augmentation to generate a modified input image, where the augmentation has second lighting properties, and changing the second lighting properties of the augmentation in the modified input image to the estimate of the first lighting properties.

18 Claims, 16 Drawing Sheets

(56) References Cited

OTHER PUBLICATIONS

Iketani, Shunya, "Augmented Reality Image Generation with Optical Consistency using Generative Adversarial Networks", 2020 IEEE Conference on Virtual Reality and 3D User Interfaces Abstracts and Workshops (VRW), IEEE, (Mar. 22, 2020), 2 pgs.

Wang, Xiang Hang, "Deep Consistent Illumination in Augmented Reality", 2019 IEEE International Symposium On Mixed and Augmented Reality Adjunct (ISMAR-ADJUNCT), IEEE, (Oct. 10, 2019), 6 pgs.

"International Application Serial No. PCT/US2021/064942, International Preliminary Report on Patentability mailed Jul. 13, 2023", 8 pgs.

\* cited by examiner

LIGHT ESTIMATION USING NEURAL NETWORKS

PRIORITY CLAIM

This application claims the benefit of priority under 35 USC 119(e) to U.S. Provisional Patent Application Ser. No. 63/133,191, filed Dec. 31, 2020, which is incorporated herein by reference in its entirety.

TECHNICAL FIELD

Examples of the present disclosure relate generally to processing images to estimate the lighting properties of the images within messaging systems. More particularly, but not by way of limitation, examples of the present disclosure relate to using neural networks to estimate the lighting properties of images, and in some examples, to use to the estimate of the lighting properties to change the lighting properties of modifications of the images.

BACKGROUND

Processing images to estimate lighting properties is complex because there may be multiple lighting sources with different color properties and directions.

Traditional computer graphic methods are very complex to implement and computationally demanding, which may make the applications too expensive to develop and which may make the applications too computationally demanding for mobile devices.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some examples are illustrated by way of example, and not limitation, in the figures of the accompanying drawings in which.

DETAILED DESCRIPTION

Figure 1:
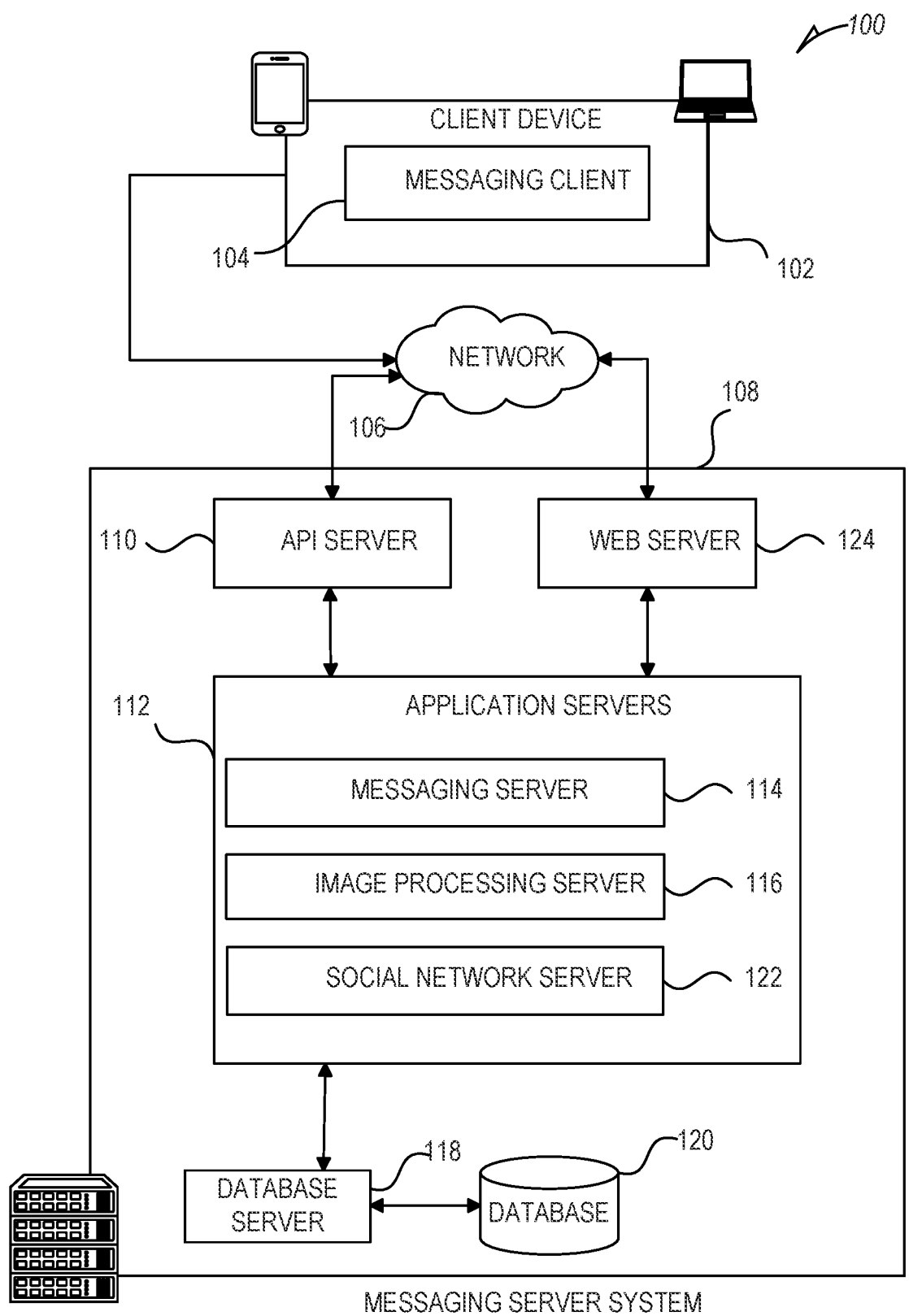
FIG. 1 is a diagrammatic representation of a networked environment in which the present disclosure may be deployed, in accordance with some examples.

The description that follows includes systems, methods, techniques, instruction sequences, and computing machine program products that embody illustrative examples of the disclosure. In the following description, for the purposes of explanation, numerous specific details are set forth in order to provide an understanding of various examples of the inventive subject matter. It will be evident, however, to those skilled in the art, that examples of the inventive subject matter may be practiced without these specific details. In general, well-known instruction instances, protocols, structures, and techniques are not necessarily shown in detail.

Often images are modified within messaging systems. For example, augmentations may be added to images after a user captures the image on their mobile device. For example, a heart may be added to the face of a person in the image. But the added augmentations may have different lighting than the lighting of the images, which may make the added augmentations appear unnatural or out of place. One technical problem is how to change the lighting properties of augmentations or modification of an image to match the lighting properties of the image. Example examples provide a system including a neural network to estimate the lighting properties of an original image and use this estimate to change the lighting properties of the augmentation or modification to the image. Changing the lighting properties of the augmentation based on the estimate of the lighting properties of the original image makes the augmentation appear more natural within the image. The more natural appearance of the augmentation may encourage the use of modifications or augmentations to images captured within the messaging system.

Another technical problem is how to generate a large enough number of images for training the neural network. The number of pairs of input and output images that are required for a ground truth is prohibitively expensive to generate by capturing actual images. In some examples, the technical problem is solved by using three-dimensional (3D) models of objects. Ground truth input images are generated using the 3D models, light conditions, and color conditions. Corresponding ground truth output images are generated using the same 3D models, the same lighting conditions, and white color conditions. The white color conditions aid in modifying the lighting properties of the augmentations. These ground truth input images and ground truth output images can be used to train a neural network to process an image and estimate the lighting properties of the image.

In some examples a library of 3D models of heads of people is used, which enables training the neural network with many different lighting properties for many different heads of people in many different positions. In some examples a generative adversarial network (GAN) is used to train a convolutional neural network to process the images to estimate the lighting properties of the image.

Networked Computing Environment

FIG. 1 is a block diagram showing an example messaging system 100 for exchanging data (e.g., messages and associated content) over a network. The messaging system 100 includes multiple instances of a client device 102, each of which hosts a number of applications, including a messaging client 104. Each messaging client 104 is communicatively coupled to other instances of the messaging client 104 and a messaging server system 108 via a network 106 (e.g., the Internet).

A messaging client 104 is able to communicate and exchange data with another messaging client 104 and with the messaging server system 108 via the network 106. The data exchanged between messaging client 104, and between a messaging client 104 and the messaging server system 108, includes functions (e.g., commands to invoke functions) as well as payload data (e.g., text, audio, video or other multimedia data).

The messaging server system 108 provides server-side functionality via the network 106 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an Application Program Interface (API) server 110 is coupled to, and provides a programmatic interface to, application servers 112. The application servers 112 are communicatively coupled to a database server 118, which facilitates access to a database 120 that stores data associated with messages processed by the application servers 112. Similarly, a web server 124 is coupled to the application servers 112 and provides web-based interfaces to the application servers 112. To this end, the web server 124 processes incoming network requests over the Hypertext Transfer Protocol (HTTP) and several other related protocols.

The Application Program Interface (API) server 110 receives and transmits message data (e.g., commands and message payloads) between the client device 102 and the application servers 112. Specifically, the Application Program Interface (API) server 110 provides a set of interfaces (e.g., routines and protocols) that can be called or queried by the messaging client 104 in order to invoke functionality of the application servers 112. The Application Program Interface (API) server 110 exposes various functions supported by the application servers 112, including account registration, login functionality, the sending of messages, via the application servers 112, from a particular messaging client 104 to another messaging client 104, the sending of media files (e.g., images or video) from a messaging client 104 to a messaging server 114, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 112 host a number of server applications and subsystems, including for example a messaging server 114, an image processing server 116, and a social network server 122. The messaging server 114 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor and memory intensive processing of data may also be performed server-side by the messaging server 114, in view of the hardware requirements for such processing.

The application servers 112 also include an image processing server 116 that is dedicated to performing various image processing operations, typically with respect to images or video within the payload of a message sent from or received at the messaging server 114.

Figure 3:
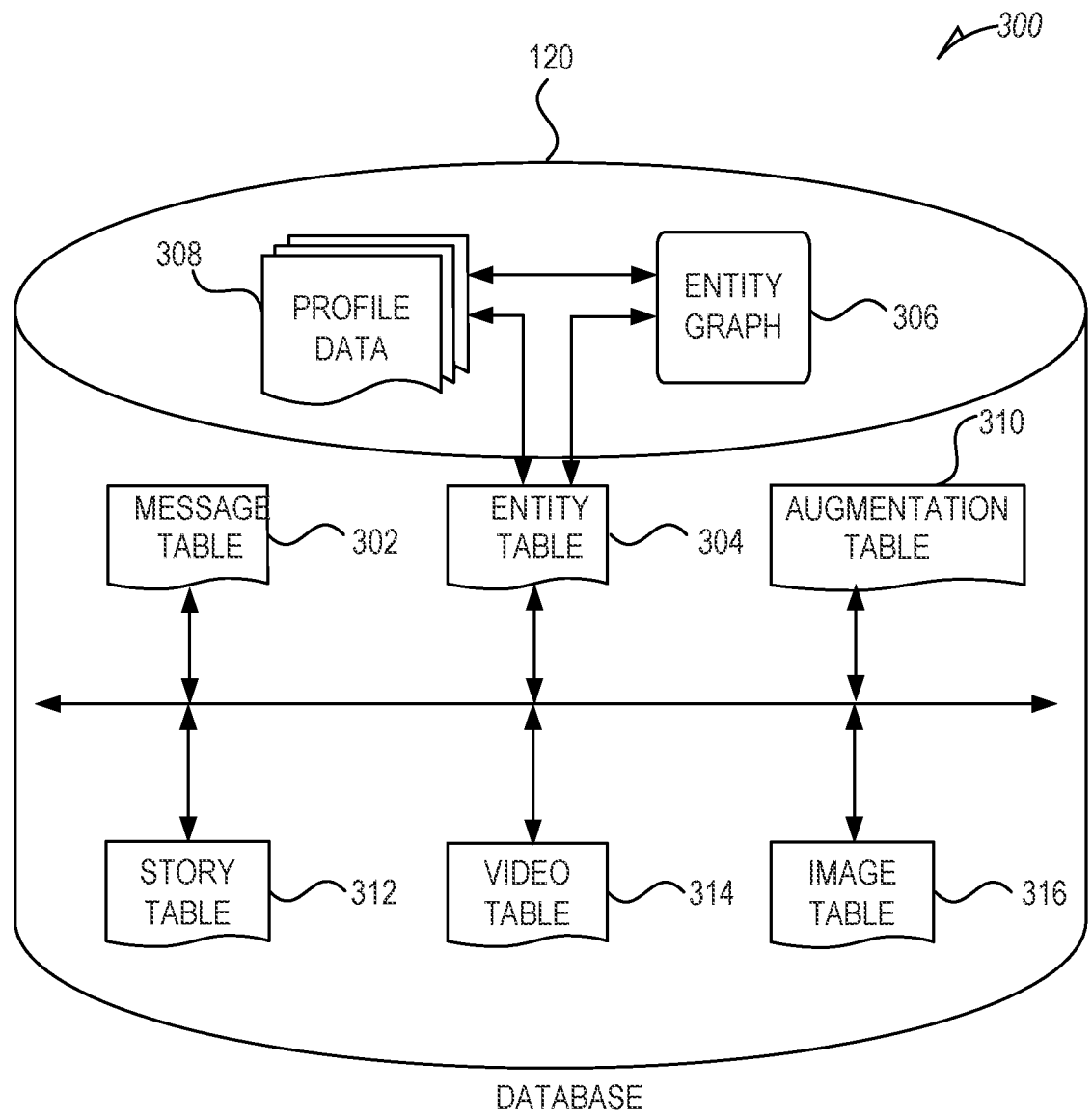
FIG. 3 is a diagrammatic representation of a data structure as maintained in a database, in accordance with some examples.

The social network server 122 supports various social networking functions and services and makes these functions and services available to the messaging server 114. To this end, the social network server 122 maintains and accesses an entity graph 306 (as shown in FIG. 3) within the database 120. Examples of functions and services supported by the social network server 122 include the identification of other users of the messaging system 100 with which a particular user has relationships or is "following," and also the identification of other entities and interests of a particular user.

System Architecture

Figure 2:
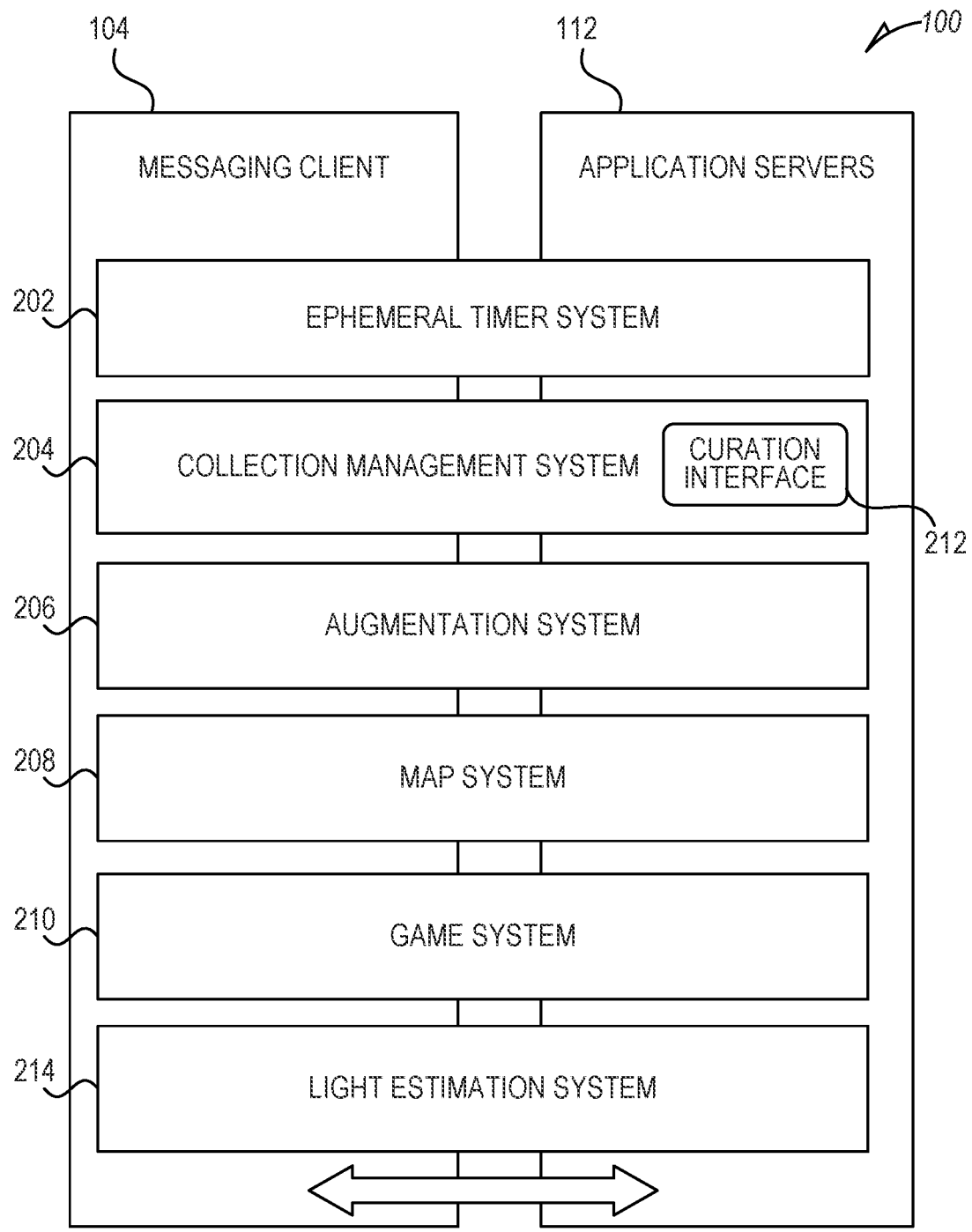
FIG. 2 is a diagrammatic representation of a messaging system, in accordance with some examples, that has both client-side and server-side functionality.

FIG. 2 is a block diagram illustrating further details regarding the messaging system 100, according to some examples. Specifically, the messaging system 100 is shown to comprise the messaging client 104 and the application servers 112. The messaging system 100 embodies a number of subsystems, which are supported on the client-side by the messaging client 104 and on the server-side by the application servers 112. These subsystems include, for example, an ephemeral timer system 202, a collection management system 204, a modification system 206, a map system 208, a game system 210, and a light estimation system 214.

The ephemeral timer system 202 is responsible for enforcing the temporary or time-limited access to content by the messaging client 104 and the messaging server 114. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 furthermore includes a curation interface 212 that allows a collection manager to manage and curate a particular collection of content. For example, the curation interface 212 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 206 provides various functions that enable a user to augment (e.g., annotate or otherwise modify or edit) media content associated with a message. For example, the augmentation system 206 provides functions related to the generation and publishing of media overlays for messages processed by the messaging system 100. The augmentation system 206 operatively supplies a media overlay or augmentation (e.g., an image filter) to the messaging client 104 based on a geolocation of the client device 102. In another example, the augmentation system 206 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In some examples, the augmentation system 206 provides a user-based publication platform that enables users to select a geolocation on a map and upload content associated with the selected geolocation. The user may also specify circumstances under which a particular media overlay should be offered to other users. The augmentation system 206 generates a media overlay that includes the uploaded content and associates the uploaded content with the selected geolocation.

In other examples, the augmentation system 206 provides a merchant-based publication platform that enables merchants to select a particular media overlay associated with a geolocation via a bidding process. For example, the augmentation system 206 associates the media overlay of the highest bidding merchant with a corresponding geolocation for a predefined amount of time.

The map system 208 provides various geographic location functions and supports the presentation of map-based media content and messages by the messaging client 104. For example, the map system 208 enables the display of user icons or avatars (e.g., stored in profile data 308) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 210 provides various gaming functions within the context of the messaging client 104. The messaging client 104 provides a game interface providing a list of available games that can be launched by a user within the context of the messaging client 104, and played with other users of the messaging system 100. The messaging system 100 further enables a particular user to invite other users to participate in the play of a specific game, by issuing invitations to such other users from the messaging client 104. The messaging client 104 also supports both the voice and text messaging (e.g., chats) within the context of gameplay, provides a leaderboard for the games, and also supports the provision of in-game rewards (e.g., coins and items).

The light estimation system 214 provides various functions related to processing images to relight or modify the lighting of augmentations and provides various functions for training neural networks such as the GAN 900. The light estimation system 214 may provide a means for user devices 102 to process an input image and relight or change the lighting of augmentations added to an image. The light estimation system 214 may provide access to a database of weights 904 that may be accessed to perform light estimation of an input image.

Data Architecture

FIG. 3 is a schematic diagram illustrating data structures 300, which may be stored in the database 120 of the messaging server system 108, according to certain examples. While the content of the database 120 is shown to comprise a number of tables, it will be appreciated that the data could be stored in other types of data structures (e.g., as an object-oriented database).

The database 120 includes message data stored within a message table 302. This message data includes, for any particular one message, at least message sender data, message recipient (or receiver) data, and a payload. Further details regarding information that may be included in a message and included within the message data stored in the message table 302 is described below with reference to FIG. 4.

An entity table 304 stores entity data, and is linked (e.g., referentially) to an entity graph 306 and profile data 308. Entities for which records are maintained within the entity table 304 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 306 stores information regarding relationships and associations between entities. Such relationships may be social, professional (e.g., work at a common corporation or organization) interested-based or activity-based, merely for example.

The profile data 308 stores multiple types of profile data about a particular entity. The profile data 308 may be selectively used and presented to other users of the messaging system 100, based on privacy settings specified by a particular entity. Where the entity is an individual, the profile data 308 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time.

Where the entity is a group, the profile data 308 for the group may similarly include one or more avatar representations associated with the group, in addition to the group name, members, and various settings (e.g., notifications) for the relevant group.

The database 120 also stores augmentation data, such as overlays or filters, in an augmentation table 310. The augmentation data is associated with and applied to videos (for which data is stored in a video table 314) and images (for which data is stored in an image table 316).

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 316 includes augmented reality content items (e.g., corresponding to applying Lenses or augmented reality experiences). An augmented reality content item may be a real-time special effect and sound that may be added to an image or a video.

As described above, augmentation data includes augmented reality content items, overlays, image transformations, AR images, and similar terms refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each element of an object are calculated (e.g., using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

In other examples, other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client application operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transform system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine taught neural networks may be used to enable such modifications.

The graphical user interface, presenting the modification performed by the transform system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

A story table 312 stores data regarding collections of messages and associated image, video, or audio data, which are compiled into a collection (e.g., a story or a gallery). The creation of a particular collection may be initiated by a particular user (e.g., each user for which a record is maintained in the entity table 304). A user may create a "personal story" in the form of a collection of content that has been created and sent/broadcast by that user. To this end, the user interface of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from varies locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 314 stores video data that, in one example, is associated with messages for which records are maintained within the message table 302. Similarly, the image table 316 stores image data associated with messages for which message data is stored in the entity table 304. The entity table 304 may associate various augmentations from the augmentation table 310 with various images and videos stored in the image table 316 and the video table 314. The database 120 can also store the weights of neural networks such as weights 904 and 923 of FIG. 9.

Data Communications Architecture

Figure 4:
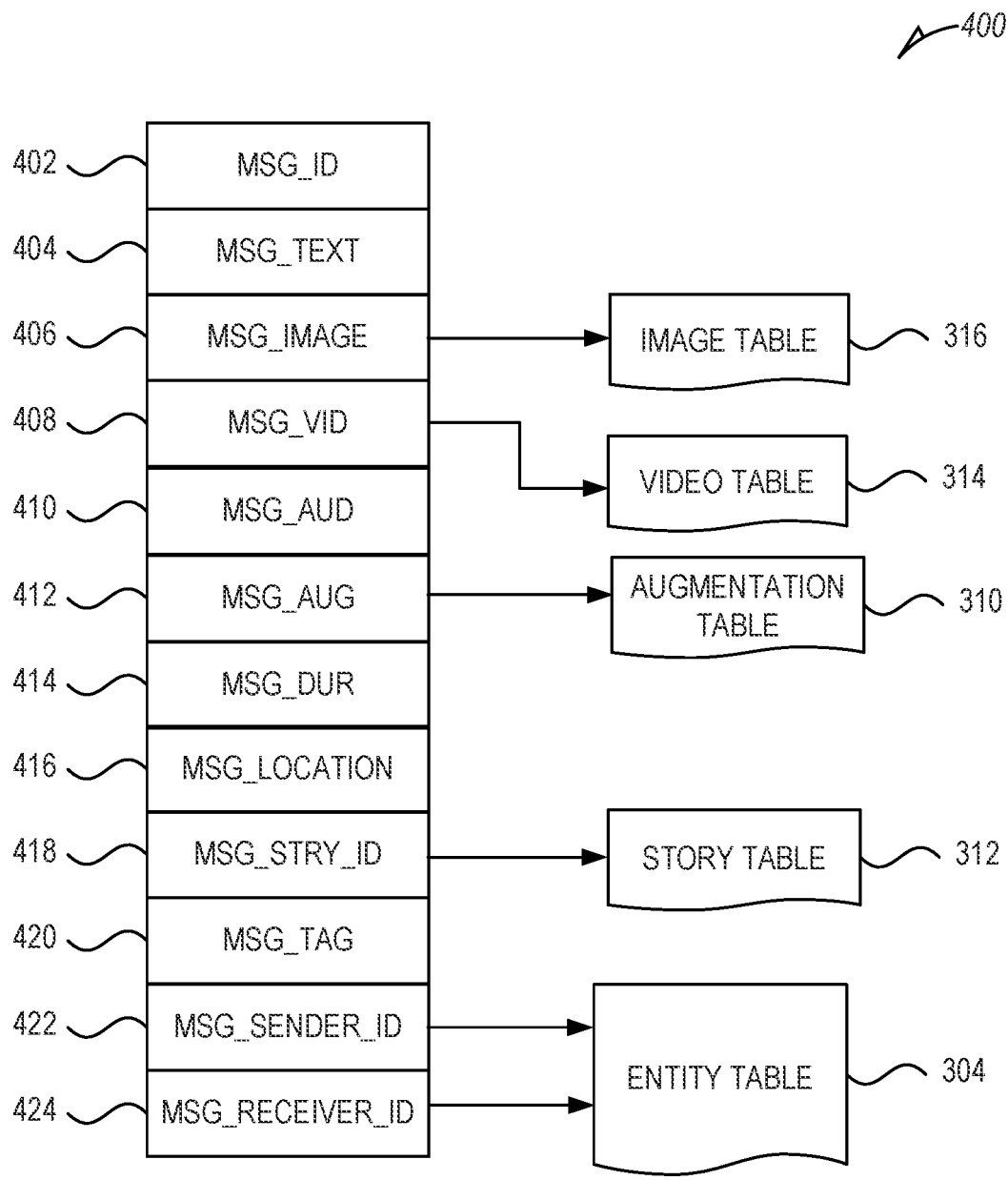
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 114. The content of a particular message 400 is used to populate the message table 302 stored within the database 120, accessible by the messaging server 114. Similarly, the content of a message 400 is stored in memory as "in-transit" or "in-flight" data of the client device 102 or the application servers 112. A message 400 is shown to include the following example components:

Message identifier 402 (MSG_ID 402): a unique identifier that identifies the message 400. Message text payload 404 (MSG_TEXT 404): text, to be generated by a user via a user interface of the client device 102, and that is included in the message 400.

Message image payload 406 (MSG_IMAGE 406): image data, captured by a camera component of a client device 102 or retrieved from a memory component of a client device 102, and that is included in the message 400. Image data for a sent or received message 400 may be stored in the image table 316.

Message video payload 408: video data, captured by a camera component or retrieved from a memory component of the client device 102, and that is included in the message 400. Video data for a sent or received message 400 may be stored in the video table 314.

Message audio payload 410: audio data, captured by a microphone or retrieved from a memory component of the client device 102, and that is included in the message 400.

Message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310.

Message duration parameter 414 (MSG_DUR 414): parameter value indicating, in seconds, the amount of time for which content of the message (e.g., the message image payload 406, message video payload 408, message audio payload 410) is to be presented or made accessible to a user via the messaging client 104.

Message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image into within the message image payload 406, or a specific video in the message video payload 408).

Message story identifier 418: identifier values identifying one or more content collections (e.g., "stories" identified in the story table 312) with which a particular content item in the message image payload 406 of the message 400 is associated. For example, multiple images within the message image payload 406 may each be associated with multiple content collections using identifier values.

Message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

Message sender identifier 422: an identifier (e.g., a messaging system identifier, email address, or device identifier) indicative of a user of the Client device 102 on which the message 400 was generated and from which the message 400 was sent.

Message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 316. Similarly, values within the message video payload 408 may point to data stored within a video table 314, values stored within the message augmentations 412 may point to data stored in an augmentation table 310, values stored within the message story identifier 418 may point to data stored in a story table 312, and values stored within the message sender identifier 422 and the message receiver identifier 424 may point to user records stored within an entity table 304.

Although the described flowcharts can show operations as a sequential process, many of the operations can be performed in parallel or concurrently. In addition, the order of the operations may be re-arranged. A process is terminated when its operations are completed. A process may correspond to a method, a procedure, an algorithm, etc. The operations of methods may be performed in whole or in part, may be performed in conjunction with some or all of the operations in other methods, and may be performed by any number of different systems, such as the systems described herein, or any portion thereof, such as a processor included in any of the systems.

Time-Based Access Limitation Architecture

Figure 5:
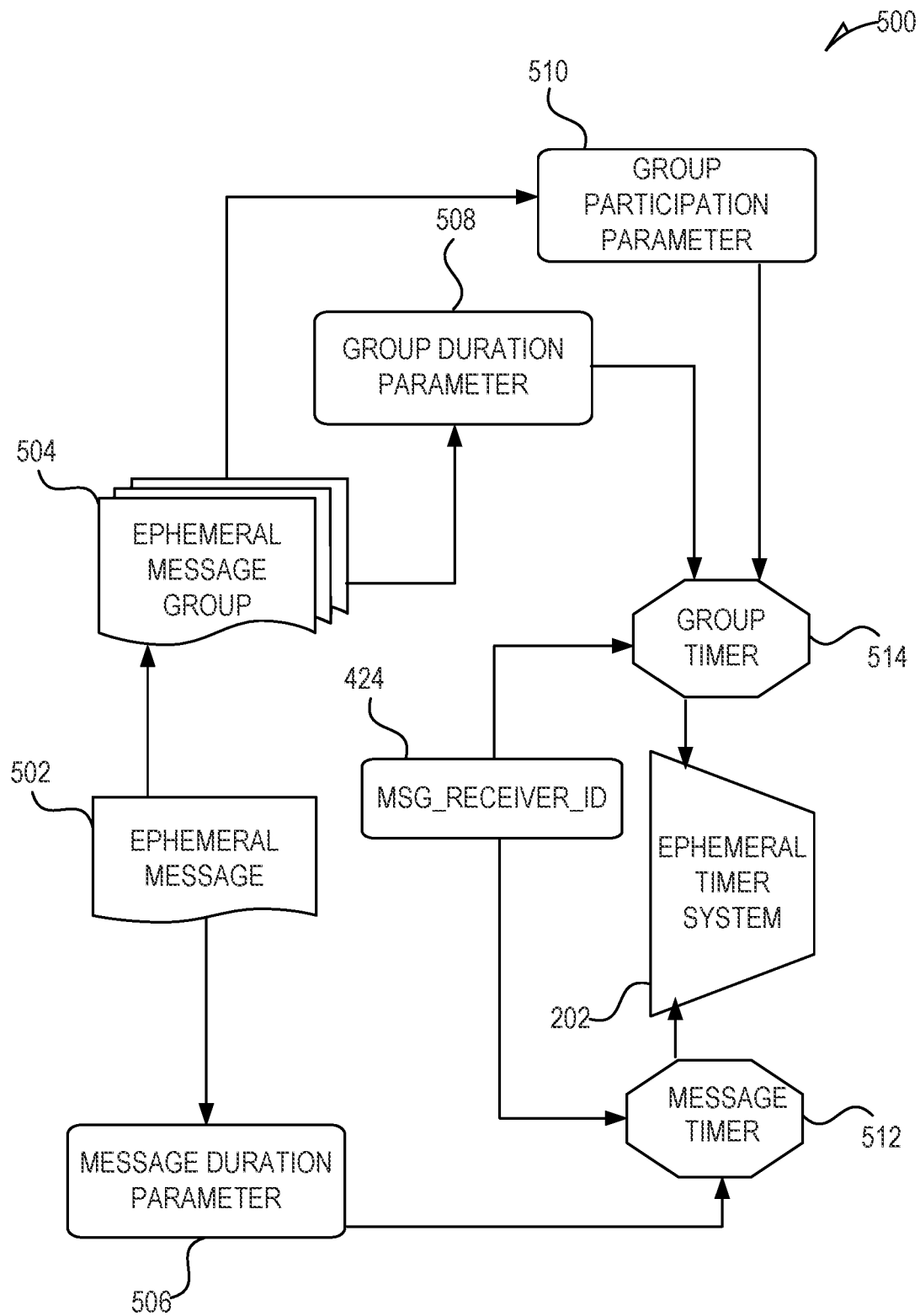
FIG. 5 is a flowchart for an access-limiting process, in accordance with some examples.

FIG. 5 is a schematic diagram illustrating an access-limiting process 500, in terms of which access to content (e.g., an ephemeral message 502, and associated multimedia payload of data) or a content collection (e.g., an ephemeral message group 504) may be time-limited (e.g., made ephemeral).

An ephemeral message 502 is shown to be associated with a message duration parameter 506, the value of which determines an amount of time that the ephemeral message 502 will be displayed to a receiving user of the ephemeral message 502 by the messaging client 104. In one example, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message group 504 (e.g., a collection of messages in a personal story, or an event story). The ephemeral message group 504 has an associated group duration parameter 508, a value of which determines a time duration for which the ephemeral message group 504 is presented and accessible to users of the messaging system 100. The group duration parameter 508, for example, may be the duration of a music concert, where the ephemeral message group 504 is a collection of content pertaining to that concert. Alternatively, a user (either the owning user or a curator user) may specify the value for the group duration parameter 508 when performing the setup and creation of the ephemeral message group 504.

Additionally, each ephemeral message 502 within the ephemeral message group 504 has an associated group participation parameter 510, a value of which determines the duration of time for which the ephemeral message 502 will be accessible within the context of the ephemeral message group 504. Accordingly, a particular ephemeral message group 504 may "expire" and become inaccessible within the context of the ephemeral message group 504, prior to the ephemeral message group 504 itself expiring in terms of the group duration parameter 508. The group duration parameter 508, group participation parameter 510, and message receiver identifier 424 each provide input to a group timer 514, which operationally determines, firstly, whether a particular ephemeral message 502 of the ephemeral message group 504 will be displayed to a particular receiving user and, if so, for how long. Note that the ephemeral message group 504 is also aware of the identity of the particular receiving user as a result of the message receiver identifier 424.

Accordingly, the group timer 514 operationally controls the overall lifespan of an associated ephemeral message group 504, as well as an individual ephemeral message 502 included in the ephemeral message group 504. In one example, each and every ephemeral message 502 within the ephemeral message group 504 remains viewable and accessible for a time period specified by the group duration parameter 508. In a further example, a certain ephemeral message 502 may expire, within the context of ephemeral message group 504, based on a group participation parameter 510. Note that a message duration parameter 506 may still determine the duration of time for which a particular ephemeral message 502 is displayed to a receiving user, even within the context of the ephemeral message group 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message group 504.

The ephemeral timer system 202 may furthermore operationally remove a particular ephemeral message 502 from the ephemeral message group 504 based on a determination that it has exceeded an associated group participation parameter 510. For example, when a sending user has established a group participation parameter 510 of 24 hours from posting, the ephemeral timer system 202 will remove the relevant ephemeral message 502 from the ephemeral message group 504 after the specified twenty-four hours. The ephemeral timer system 202 also operates to remove an ephemeral message group 504 when either the group participation parameter 510 for each and every ephemeral message 502 within the ephemeral message group 504 has expired, or when the ephemeral message group 504 itself has expired in terms of the group duration parameter 508.

In certain use cases, a creator of a particular ephemeral message group 504 may specify an indefinite group duration parameter 508. In this case, the expiration of the group participation parameter 510 for the last remaining ephemeral message 502 within the ephemeral message group 504 will determine when the ephemeral message group 504 itself expires. In this case, a new ephemeral message 502, added to the ephemeral message group 504, with a new group participation parameter 510, effectively extends the life of an ephemeral message group 504 to equal the value of the group participation parameter 510.

Responsive to the ephemeral timer system 202 determining that an ephemeral message group 504 has expired (e.g., is no longer accessible), the ephemeral timer system 202 communicates with the messaging system 100 (and, for example, specifically the messaging client 104) to cause an indicium (e.g., an icon) associated with the relevant ephemeral message group 504 to no longer be displayed within a user interface of the messaging client 104. Similarly, when the ephemeral timer system 202 determines that the message duration parameter 506 for a particular ephemeral message 502 has expired, the ephemeral timer system 202 causes the messaging client 104 to no longer display an indicium (e.g., an icon or textual identification) associated with the ephemeral message 502.

Light Estimation Using Neural Networks

Figure 6:
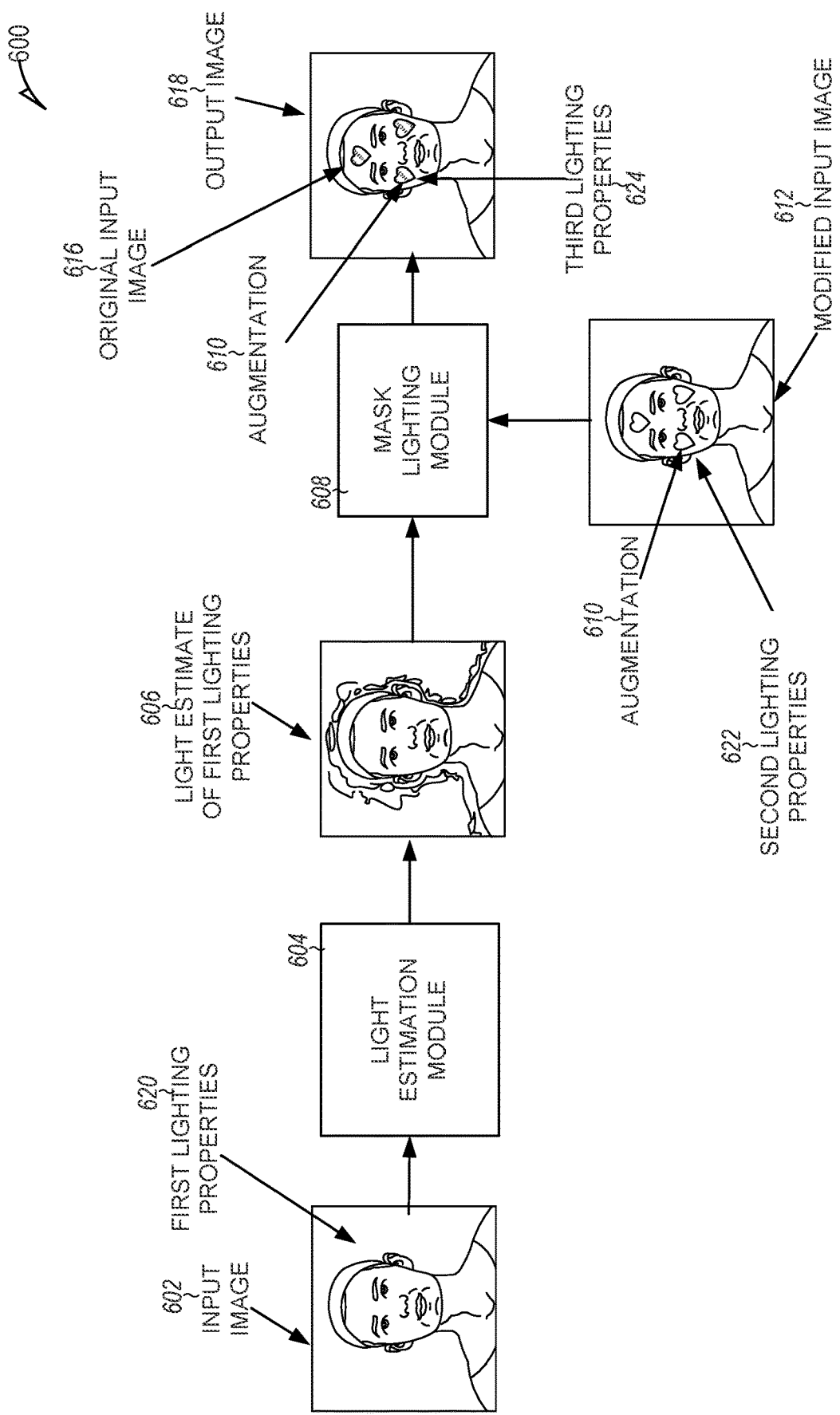
FIG. 6 illustrates a system for light estimation system, in accordance with some examples.

FIG. 6 illustrates a system 600 for light estimation system, in accordance with some examples. In one example, the lighting estimation module 604 and mask lighting module 608 reside on a client device 102 and are configured to adjust the lighting of augmentations that are added to images such as is described as follows.

The input image 602 is an image such as a generated image from a camera of a client device 102. The following are examples, but not by way of limitation, of the input image 602. The input image 602 is an image generated by augmented reality (AR) glasses and the augmentation 610 is added an AR object. The input image 602 is an image rendered by a graphical program. The input image 602 is an image downloaded from the internet such as a stock image. The input image 602 is part of a video or sequence of images. The input image 602 is an image captured by the client device 102 of FIG. 1 where the augmentation 610 is an augmentation added by the messaging system 100.

The light estimation module 604 takes or processes an input image 602 with first lighting properties 620 and generates or outputs the light estimation of first lighting properties 606. The light estimation module 604 is a convolution neural network in some examples. The modified input image 612 is the input image 602 modified by the augmentation 610. For example, a user of the messaging system 100 may add an augmentation 610 of the augmentation system 206 to the input image 602 to generate the modified input image 612. The augmentation 610 has second lighting properties 622, which may make the augmentation 610 appear unnatural. In some examples, the augmentation 610 is modified by the light estimate of first lighting properties before being integrated with the input image 602. The augmentation 610 as illustrated is a heart on the face of a person.

The mask lighting module 608 changes the second light properties 622 of the augmentation 610 in accordance with the light estimate of first lighting properties 606. The mask light module 608 determines the portions of the modified input image 612 that include augmentations 610 and uses those corresponding portions from the light estimate of first lighting properties 606 to change the second lighting properties 622 in the modified input image 612 to the third lighting properties 624 in the output image 618. For example, as illustrated the augmentation 610 is a heart on a cheek of a woman. The mask lighting module 608 uses the portion of the light estimate of first lighting properties 606 corresponding to the cheek of the woman to modify the second lighting properties 622 to generate the third lighting properties 624 in the output image 618.

The third lighting properties 624 are determined from the light estimate of first lighting properties 606. In some examples, mask lighting module 608 determines corresponding pixels between the light estimate of first lighting properties 606 and the augmentation 610 within the output image 618. In some examples, the images are composed of layers and the augmentation 610 is a different layer. The mask lighting module 608 may map the augmentation 610 pixel by pixel to pixels of the light estimate of first lighting properties 606, and then determine the new values for the pixels within the augmentation 610 based on the corresponding pixel values of the light estimate of first light properties 606. For example, in the case where each pixel has a hue value, a saturation value, and a brightness value, then the new value for the pixel of the augmentation 610 is determined based on the hue value, saturation value, and brightness value of the corresponding pixel of the light estimate of the first light properties 606. In one example, the brightness value of the augmentation 610 is set based on the brightness value of the corresponding pixel of the light estimate of the first light properties 606.

The output image 618 includes portions that are the original input image 616 and portions that are augmentations 610. In some examples mask lighting module 608 creates a mask where the mask has the light estimate of first lighting properties 606 for those portions of the modified input image 612 that are changed from the input image 602 and where the mask indicates no change for those portions of the modified input image 612 that have not been changed. In some examples mask lighting module 608 is configured to determine the portions of input image 602 that have been changed to generate the modified input image 612. In some examples the augmentation system 206 provides information that indicates the portions of the modified input image 612 that are modified from the input image 602. In some example, the augmentation 610 is a separate layer and the modified input image 612 is a rendering of or blending of the layers. In some examples, regions of the modified input image 612 are determined or indicated as the regions of the modified input image 612 that have been changed from the input image 602. The modified input image 612 is a same size as the light estimate of first lighting properties 606, in accordance with some examples.

In some examples the augmentations 610 are 2 dimensional (2D) augmentations 610. As illustrated, there are only 3 augmentations 610 and they are all hearts. In some examples, there may be fewer or a greater number of augmentation 610 and the augmentations 610 may be different. In some examples the augmentation 610 may be an editing of the input image 602 by a user. For example, a user may edit the input image 602 in an image editing program. The mask lighting module 608 then compares the input image 602 with the modified input image 612 to determine the areas, regions, or portions of the modified input image 612 to change the second lighting properties 622 to the third lighting properties 624. In some examples the augmentations 610 may each have different lighting properties 622. The augmentation 610 may have generic lighting properties for an augmentation item.

The augmentation 610 may be added to the modified input image 612 by an application that scales and determines a location to place the augmentation 610 within the modified input image 612. For example, the application may scale and locate the augmentation 610 so that it appears realistic within the context of the modified input image 612 such as placing it on a face of a person; however, the second lighting properties 622 may be different than the first lighting properties 620 of the input image 602, which may give the impression that the augmentation 610 does not belong to the modified input image 612 or that the augmentation 610 was added to the modified input image 612. The second lighting properties 622 may be unrelated to the first lighting properties 620, in accordance with some examples.

Changing the lighting of the augmentation 610 with third lighting properties 624, as explained above, will make it appear more natural in the output image 618, as though it were originally part of the image versus an object later added to the image. Thus, the output image 618 based on the third lighting properties 624 results in an improved image. In some examples the augmentation 610 is identified with location information that can be used to identify the pixels where the augmentation 610 is located within the modified input image 612. In some examples the augmentation 610 may be in a different layer or channel of the modified input image 612 so that the augmentation 610 may be identified by the layer or channel.

The output image 618 includes the augmentation 610 with the third lighting properties 624 that are more similar to the first lighting properties 620 than the second lighting properties 622 are to the first lighting properties 620. The lighting properties include a hue value, a saturation value, and a brightness value for each pixel of the image, in accordance with some examples. In some examples, the lighting properties may include multiple channels or layers for each of the pixels of the image where for a channel or layer there is a hue value, a saturation value, and a brightness value, in accordance with some examples. An image or an object may be rendered or displayed by combining values in each of the layers in a predetermined way. In some examples the lighting properties include for each pixel intensity values for red light, green light, and blue light where the color is determined by adding the three values together. One skilled in the art will recognize that other representations of the colors may be used. In some examples the lighting properties may include information related to the object or image such as a transparency, a reflectivity, or information related to light sources used to generate the image. In some examples, the third lighting properties 624 are determined by combining or blending in accordance with a formula the lighting properties of light estimate of first light properties 606 on a per pixel basis to the augmentation 610. In some examples, the mask lighting module 608 interprets the light estimate of first lighting properties 606 as if the objects in the light estimate of first lighting properties 606 were all white for the purposes of determining the third lighting properties 624. In some examples, mask lighting module 608 is implemented with a CNN.

Figure 7:
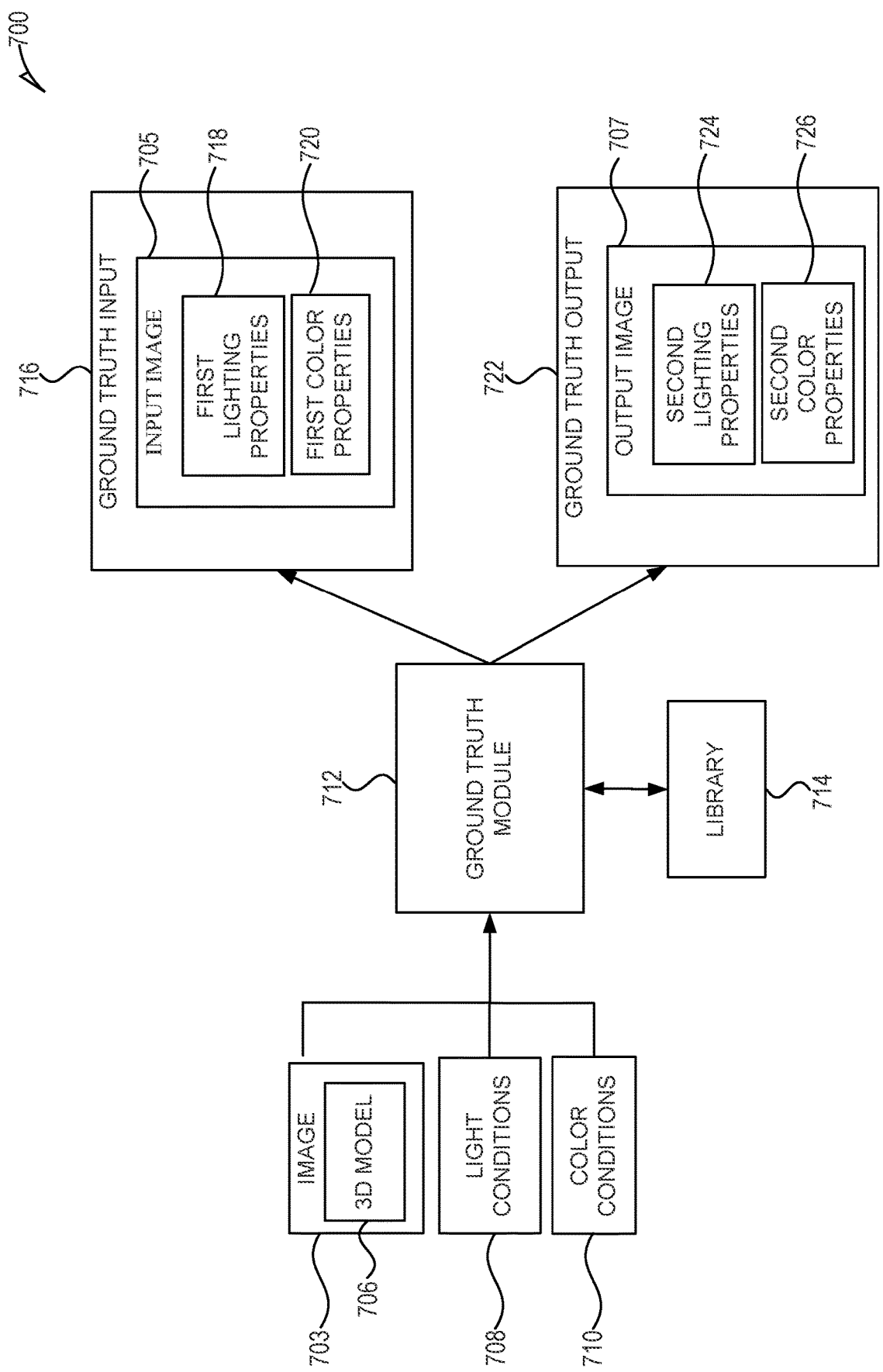
FIG. 7 illustrates the operation of a ground truth module for generating a ground truth, in accordance with some examples.

FIG. 7 illustrates the operation 700 of a ground truth module 712 for generating a ground truth, in accordance with some examples. Ground truth module 712 generates ground truth input 716 and ground truth output 722 from an image 703 with light conditions 708 and color conditions 710. In some examples, the image 703 is a three-dimensional (3D) model 706

The light conditions 708 indicate information for rendering or displaying the 3D model 706 or image such as a hue value, a saturation value, and a brightness value. The lighting conditions 708 indicate a number of light sources where each light source is represented by a direction, a hue value, a saturation value, and a brightness value, in accordance with some examples. The 3D model 706 includes geometric information of an object such as a head or another object where the geometric information define the boundaries of the object. The color conditions 710 indicates the colors of the 3D model 706. The 3D model 706 of an object may include additional information such as the transparency or reflectivity of portions of the object and other information that may be included for rendering objects given lighting conditions.

In some examples the image 703 is already rendered as input image 705 and includes the first lighting properties 718 and first color properties 720. In some examples ground truth module 712 renders the 3D model 706 to generate input image 705. The ground truth module 712 uses the color conditions 710 to determine the first color properties 720. The ground truth module 712 uses light conditions 708 to determine first lighting properties 718.

The first color properties 720 may be the same as the color conditions 710, in accordance with some examples. In some examples ground truth module 712 renders the 3D model 706 based on the light conditions 708 and color conditions 710 to generate ground truth input 716 including input image 705 having first lighting properties 718 and first color properties 720. In some examples ground truth module 712 renders the 3D model 706 based on the light conditions 708 and color conditions of all objects white to generate ground truth output 722 including output image 707 having second lighting properties 724 and second color properties 720. The second color properties 726 indicate that the objects in the output image 707 are white, in accordance with some examples. The ground truth input 716 and ground truth output 722 are used to train the GAN 900.

The second color properties 726 may be white or variations of white that aid mask lighting module 608 in using the lighting information in light estimate of first light properties 606 to determine third lighting properties 624. In some examples, the first lighting properties 718 and the second lighting properties 724 are the same or similar. The first lighting properties 718 and the second lighting properties 724 may be different only in that they were both generated from light conditions 708 but input image 705 is generated from color conditions 710 and output image 707 is generated with color conditions indicating that all objects defined by 3D model 706 should be white or close to white. Ground truth module 712 uses a library 714 of 3D models 706, light conditions 708, and color conditions 710 to generate many different pairs of ground truth inputs 716 and ground truth outputs 722. The images 703 include images or 3D models 706 of augmentations.

Figure 8:
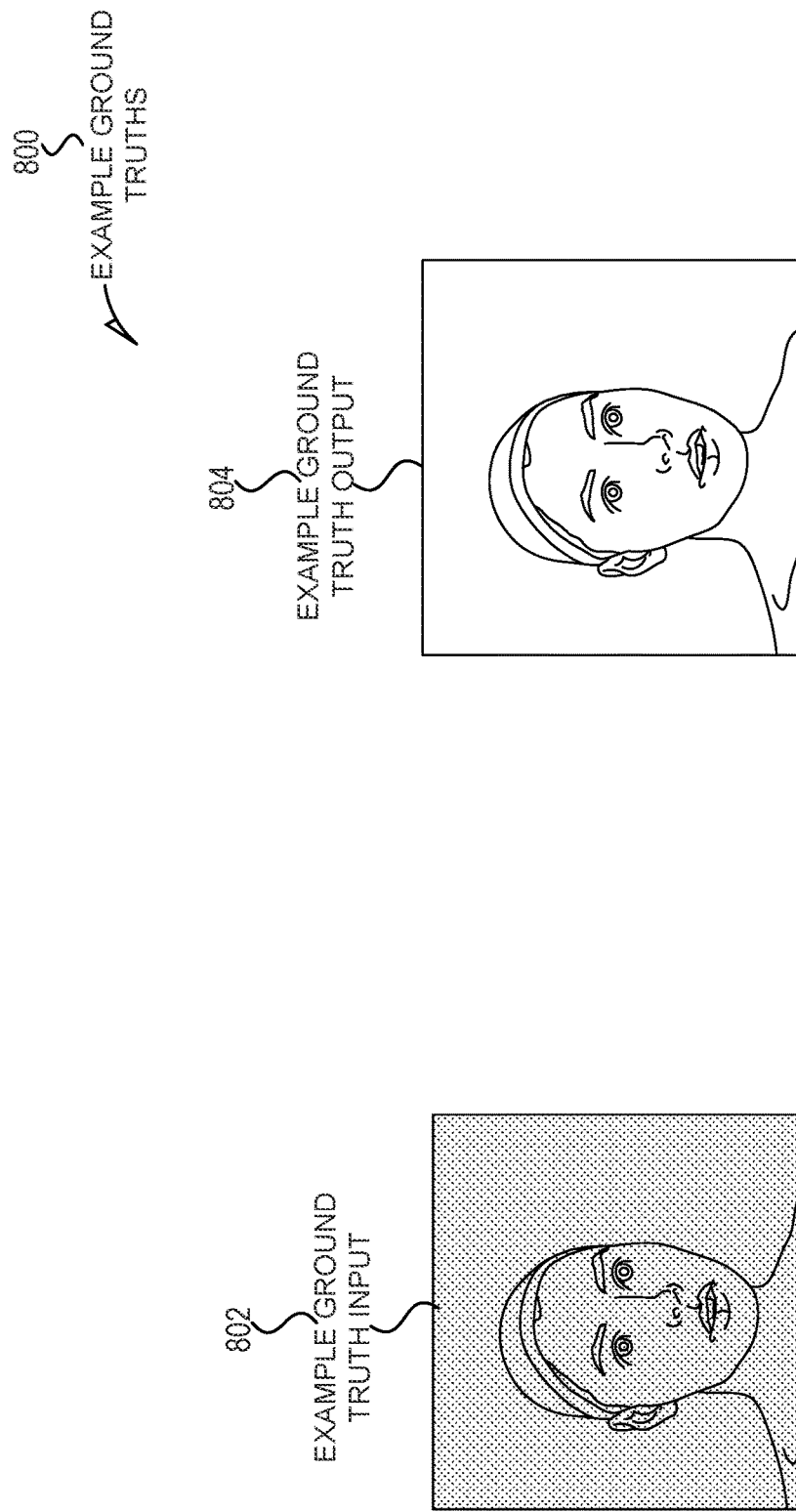
FIG. 8 illustrates an example of ground truths, in accordance with some examples.

FIG. 8 illustrates an example of ground truths 800, in accordance with some examples. The example ground truth input 802 may have been generated by ground truth module 712 using 3D model 706, light conditions 708, and color conditions 710. The example ground truth output 804 may have been generated by ground truth module 712 using 3D model 706, light conditions 708, and color conditions that indicate that all objects defined by the 3D model 706 should be white.

Figure 9:
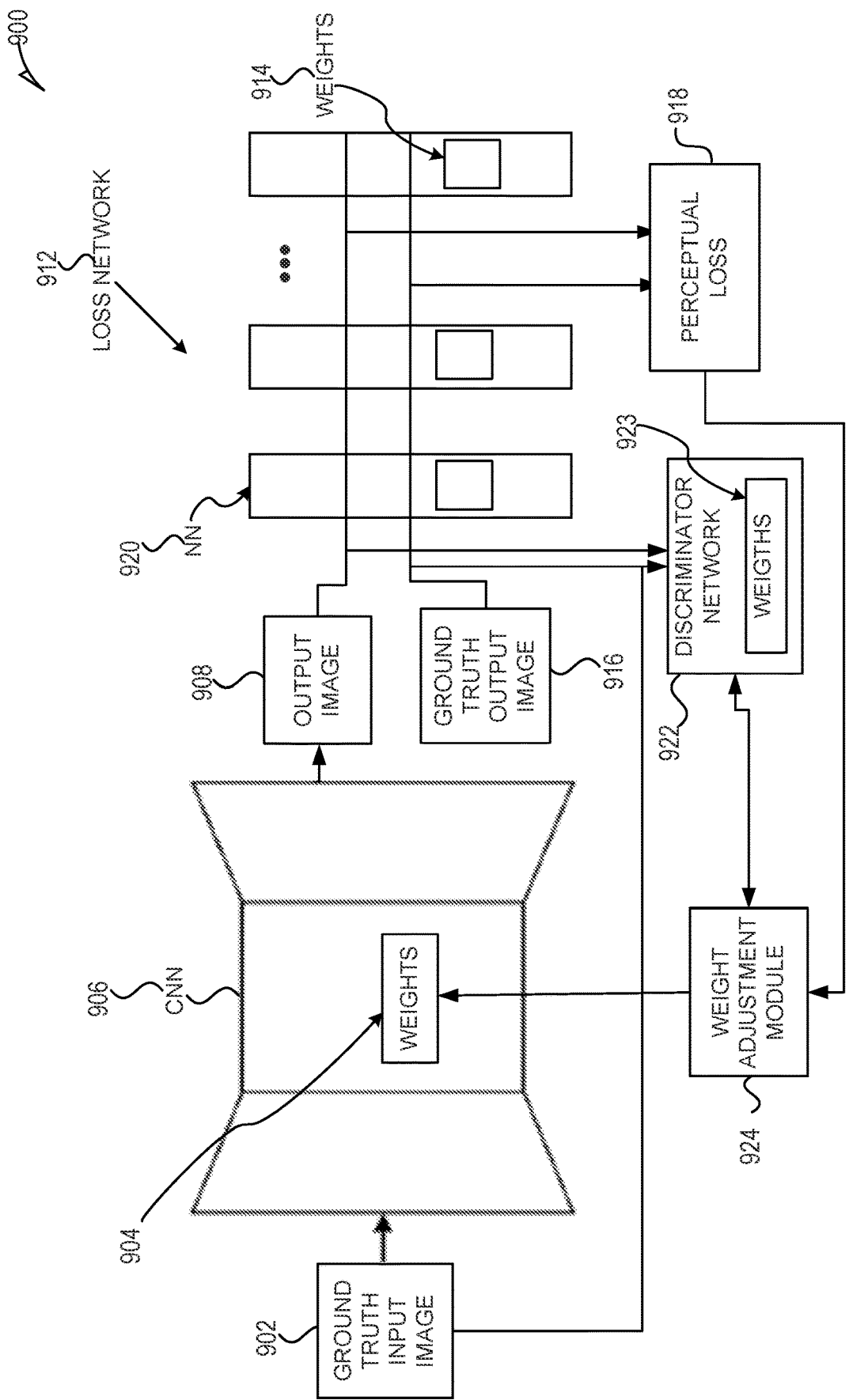
FIG. 9 illustrates a generative adversarial network (GAN) for training convolutional neural networks (CNNs), in accordance with some examples.

FIG. 9 illustrates a generative adversarial network (GAN) 900 for training convolutional neural networks (NNs) (CNNs), in accordance with some examples. The CNN 906 processes ground truth input image 902 to generate output image 908. In one example, ground truth input image 902 is the same or similar as ground truth input 716 and ground truth output image 916 is the same or similar as ground truth output 722.

The CNN 906, loss network 912, and discriminator network 922 are convolutional neural networks, in accordance with some examples. Each has multiple convolutional layers, pooling layers, and fully connected layers, in accordance with some examples. One or more of the networks may have up sampling and down sampling. One or more of the networks may have layers that are connected to the next layer in the network and an additional layer closer to the output layer. The fully connected layers use rectified linear unit (ReLU), in accordance with some examples.

Weight adjustment module 924 is configured to adjust the weights 904 of the CNN 906 based on the perceptual losses 918 and adversarial losses from the discriminator network 922. Weight adjustment module 924 adjusts the weights 904 based on using a stochastic gradient descent method to determine weights 904 that minimize or lessen the weighted sum of the loss functions. Weight adjustment module 924 additionally trains discriminator network 922 by changing the weights 923 as described herein.

The perceptual loss 918 is determined with the aid of a number of trained NNs 920 with weights 914. The loss network 912 is trained based on images representing high-level features that are grouped into sets of high-level features, in accordance with some examples. The high-level features may include coloring information and lighting information. Each of the NNs 920 may be trained for one or more high-level features. The trained NNs 920 determine high-level features for both the output image 908 and the ground truth output image 916. The perceptual loss 918 is based on determining a high-level feature loss of the output image 908 from the ground truth output image 916. The perceptual loss is then determined by weight adjustment module 924 based on regression analysis, in accordance with some examples. The weight adjustment module 924 uses Equation (1) to determine the perceptual loss ($loss_{per}$), in accordance with some examples. The $loss_{per}$ uses the weights formed in the NN 920 to train the CNN 906 to have similar weights.

$$\text{Loss}_{per} = E[\Sigma_{i=1}^{n} w_i l_{feat}(y_i, \hat{y}_i)], \quad \text{Equation (1)}.$$

where $y_i$ is the ground truth output image 916, $\hat{y}_i$ is the output image 908, E is the expected value of the summation, n is the number of ground truth pairs, $l_{feat}$ is the feature reconstruction loss between $y_i$ and $\hat{y}_i$ for the features in accordance with the trained NNs 920, and $w_i$ is a weight assigned to the feature i.

The loss of the CNN 906 is determined by adjust weights module 924 using Equation (2). Equation (2): $G_{loss} = E[\log(1-D(G(x)))]$, where $G_{loss}$, is the loss for image transformation network, E is the expected value, and D is the determination of the discriminator network.

The discriminator network 922 is trained to take as input the ground truth input image 902 and an output image 908 and output a value between 0 and 1 to indicate the likelihood that the output image 908 is the ground truth output image 916. The loss of the discriminator network 922 is determined by weight adjustment module 924 in accordance with Equation (3).

$$D_{loss} = -E[\log(D(x_{real})) + \log(1-D(G(x)))], \quad \text{Equation (3)}:$$

where $D_{loss}$, is the loss for the discriminator network 922, E is the expected value, x is the ground truth input image 902, and $x_{real}$ is the ground truth output image 916, $D(x_{real})$ is the prediction such as a value from 0 to 1 for whether $x_{real}$ is the ground truth output image 916, and $D(G(x))$ is the prediction such as a value from 0 to 1 for whether $G(x)$, which is output image 908, is the ground truth output image 916.

Weight adjustment module 924 determines the loss function for the CNN 906 in accordance with Equation (4). Equation (4): $\text{Loss} = \text{Loss}_{per} + \alpha * G_{loss}$, where loss is the loss used to train the CNN 906, $\text{Loss}_{per}$ is determined in accordance with Equation (1), $G_{loss}$, is determined in accordance with Equation (2), and $\alpha$ is a constant less than 1.

Weight adjustment module 924 trains CNN 906 and discriminator network 922 in conjunction with one another. As the discriminator network 922 becomes better at determining whether the output image 908 is the ground truth output image 916 or not, the CNN 906 is trained to make the output image 908 more like the ground truth output image 916. In this way the two networks help each other train because as the discriminator network 922 improves in distinguishing the output image 908 and the ground truth output image 916, the CNN 906 improves in generating the output image 908 to being closer to the ground truth output image 916. The ground truth module 712 of FIG. 7 is used to generate pairs of ground truth inputs 716 and ground truth outputs 722 that are used by the weight adjustment module 924 to train the CNN 906 and the discriminator network 922. Because the ground truth module 712 can generate an arbitrarily large set of training pairs under many different lighting scenarios and different 3D models, the CNN 906 can be trained to process or transform the lighting under many different lighting scenarios and many different 3D models.

Figure 10:
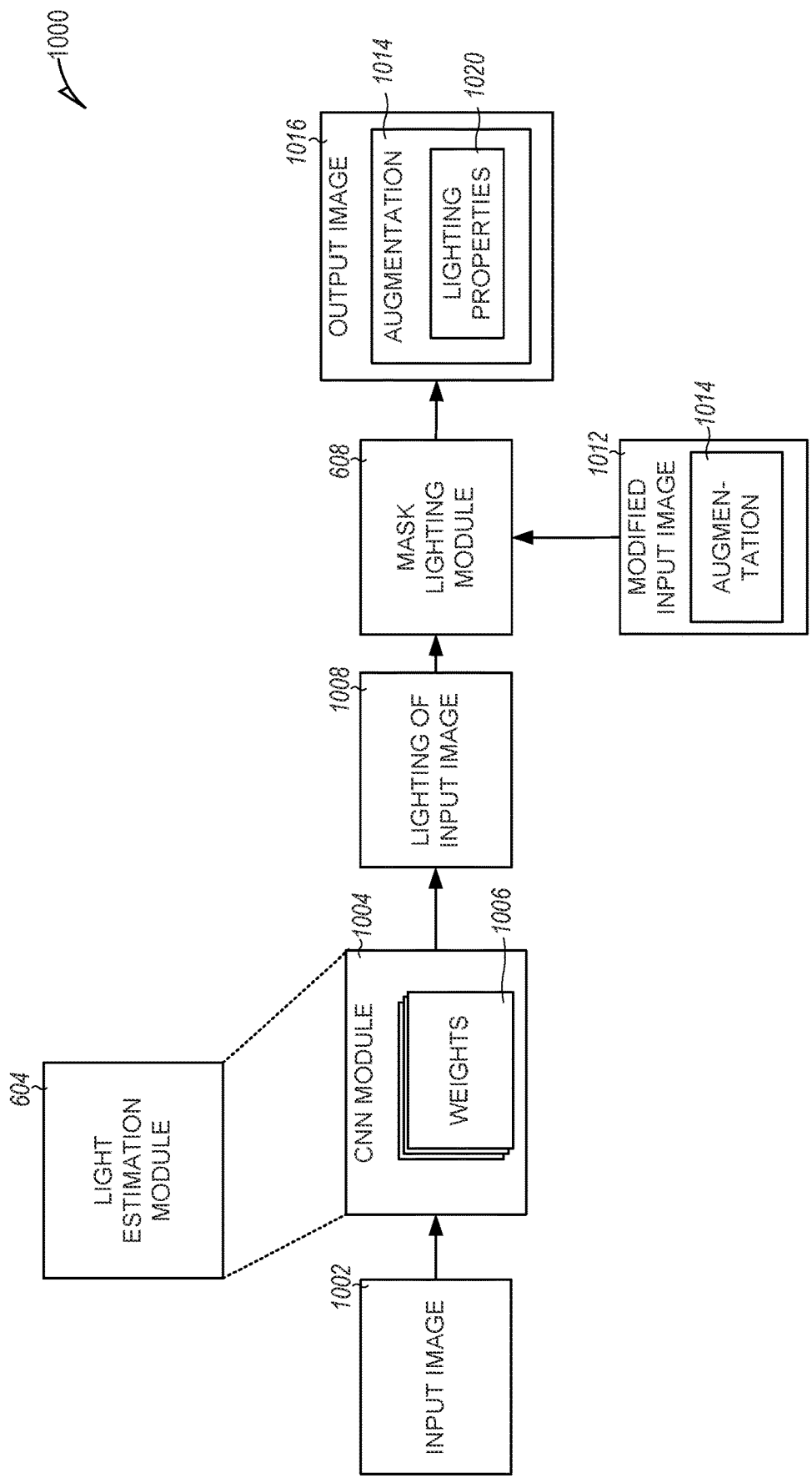
FIG. 10 illustrates a system for light estimation, in accordance with some examples.

FIG. 10 illustrates a system 1000 for light estimation, in accordance with some examples. The CNN module 1004 is an example of a light estimation module 604 of FIG. 6. The weights 1006 used by the CNN module 1004 are for processing the input image 1002 to generate lighting of input image 1008. The weights 1006 of CNN module 1004 are determined as described in conjunction with FIG. 9, in accordance with some examples.

The CNN module 1004 takes an input image 1002 and generates lighting of input image 1008. Examples of the input image 1002 is input image 602 of FIG. 6 and example ground truth input 802 of FIG. 8. Examples of the lighting of input image 1008 are light estimation of first light properties 606 of FIG. 6 and ground truth output 804 of FIG. 8.

Mask lighting module 608 determines lighting properties 1020 of augmentation 1014 and generates the output image 1016. Modified input image 1012 is the same as input image 1002 with an augmentation 1014. The augmentation 1014 is the same or similar as augmentation 610. Examples of the output image 1016 are output image 618 of FIG. 6 and example ground truth output 804 of FIG. 8. Augmentation 1014 may be the same or similar as augmentation 610. The lighting properties 1020 of augmentation 1014 are the same or similar as third lighting properties 624.

Figure 11:
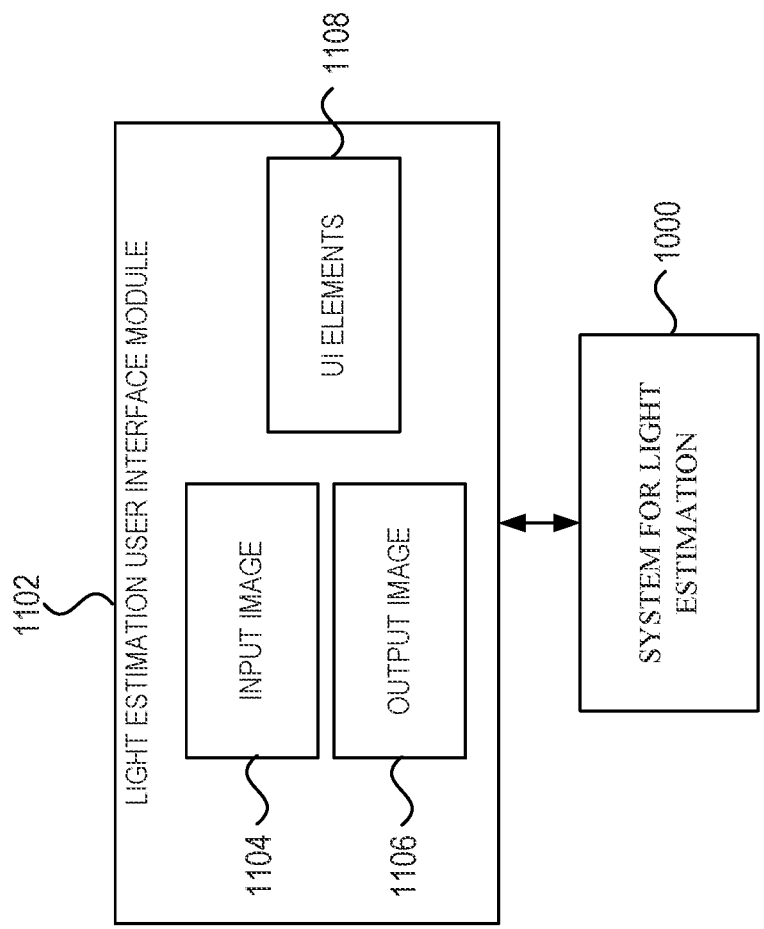
FIG. 11 illustrates light estimation user interface module, in accordance with some examples.

FIG. 11 illustrates light estimation user interface module 1102, in accordance with some examples. The light estimation user interface module 1102 makes the functionality of the system 1000 for light estimation available to users. The light estimation user interface module 1102 is part of an edit and enhance 1208 system of FIG. 12. The light estimation user interface module 1102 accesses database 120, in accordance with some examples. The light estimation user interface module 1102 operates on the client device 102. The light estimation user interface module 1102 comprises an input image 1104, an output image 1106, and UI elements 1108. The input image 1104 may be the same or similar as input image 1002. The output image 1106 may be the same or similar as output image 1016. The UI elements 1108 are images and interactions the light estimation user interface module 1102 is configured to perform. The system 1000 for light estimation may be the light estimation system 214 of FIG. 2 or may reside on the client device 102.

Figure 12:
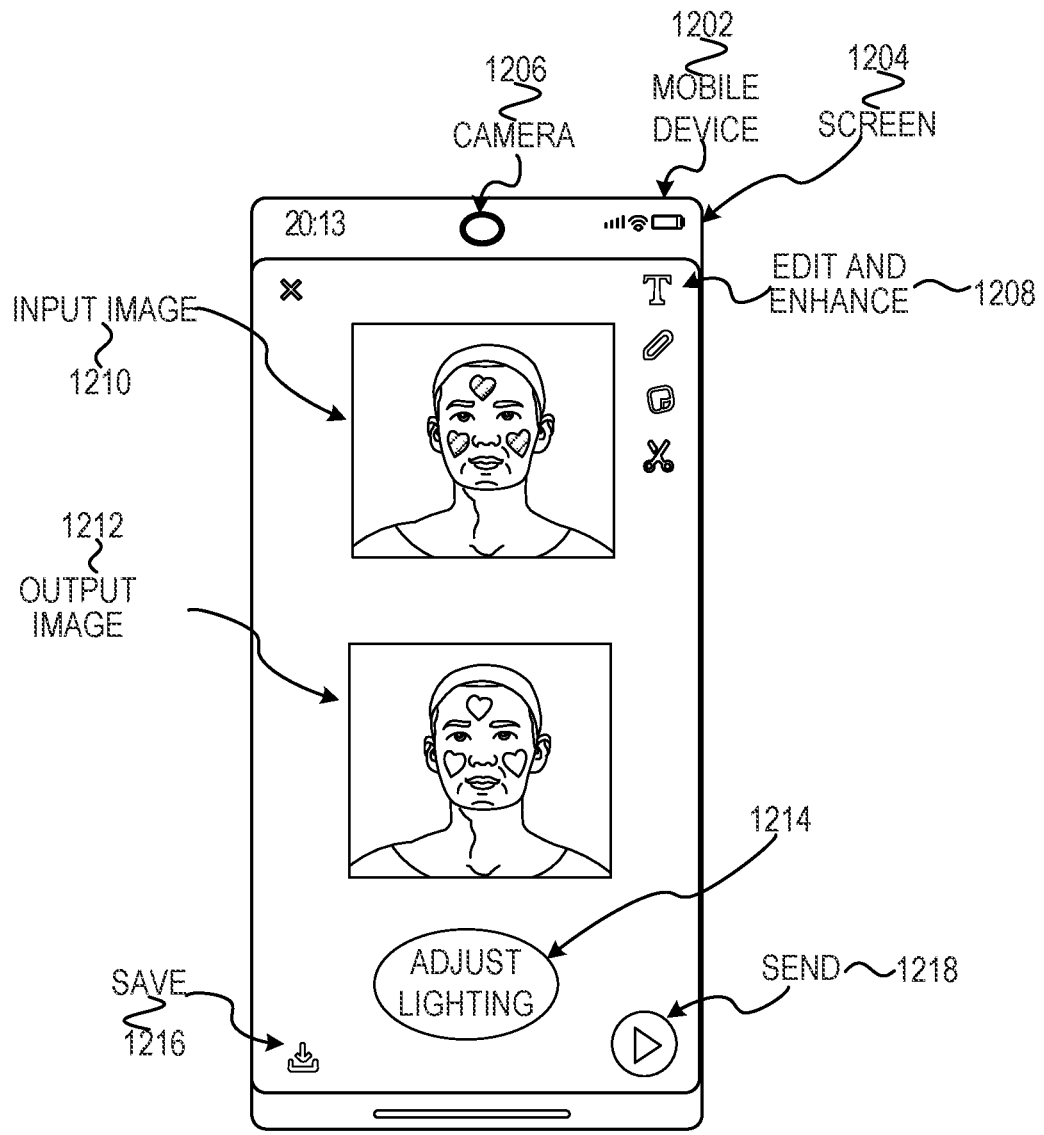
FIG. 12 illustrates the operation of light estimation user interface module, in accordance with some examples.

FIG. 12 illustrates the operation of light estimation user interface module 1102, in accordance with some examples. FIG. 12 illustrates a mobile device 1202, which may be a client device 102, in accordance with some examples. The mobile device 1202 may include a camera 1206 and screen 1204. The user of the mobile device 1202 may have taken an image of herself and then using edit and enhance 1208 added augmentations of three hearts on her face to generate the input image 1210. The input image 1210 is processed to generate output image 1212 in response to the user selecting the adjust lighting 1214 option. Other adjust lighting options are available, in accordance with some embodiments.

The user may select to save 1216 the output image 1212 to the user's personal storage or to send 1218 the output image 1212 such as through the messaging system 100 as an ephemeral message. The user may select edit and enhance 1208 to change the output image 1212 or add additional augmentations to the output image 1212. The hearts in the output image 1212 appear more natural than the hearts in the input image 1210, in accordance with some examples.

In some examples, the weights 1006 for the CNN module 1004 are selected based on the augmentations added to the input image 1210. For example, one set of weights 1006 are trained for hearts or additions to the face and another set of weights 1006 are trained other augmentations such as adding 3D animals to the input image 1210. Many different sets of weights 1006 are trained to improve the output image 1212.

Figure 13:
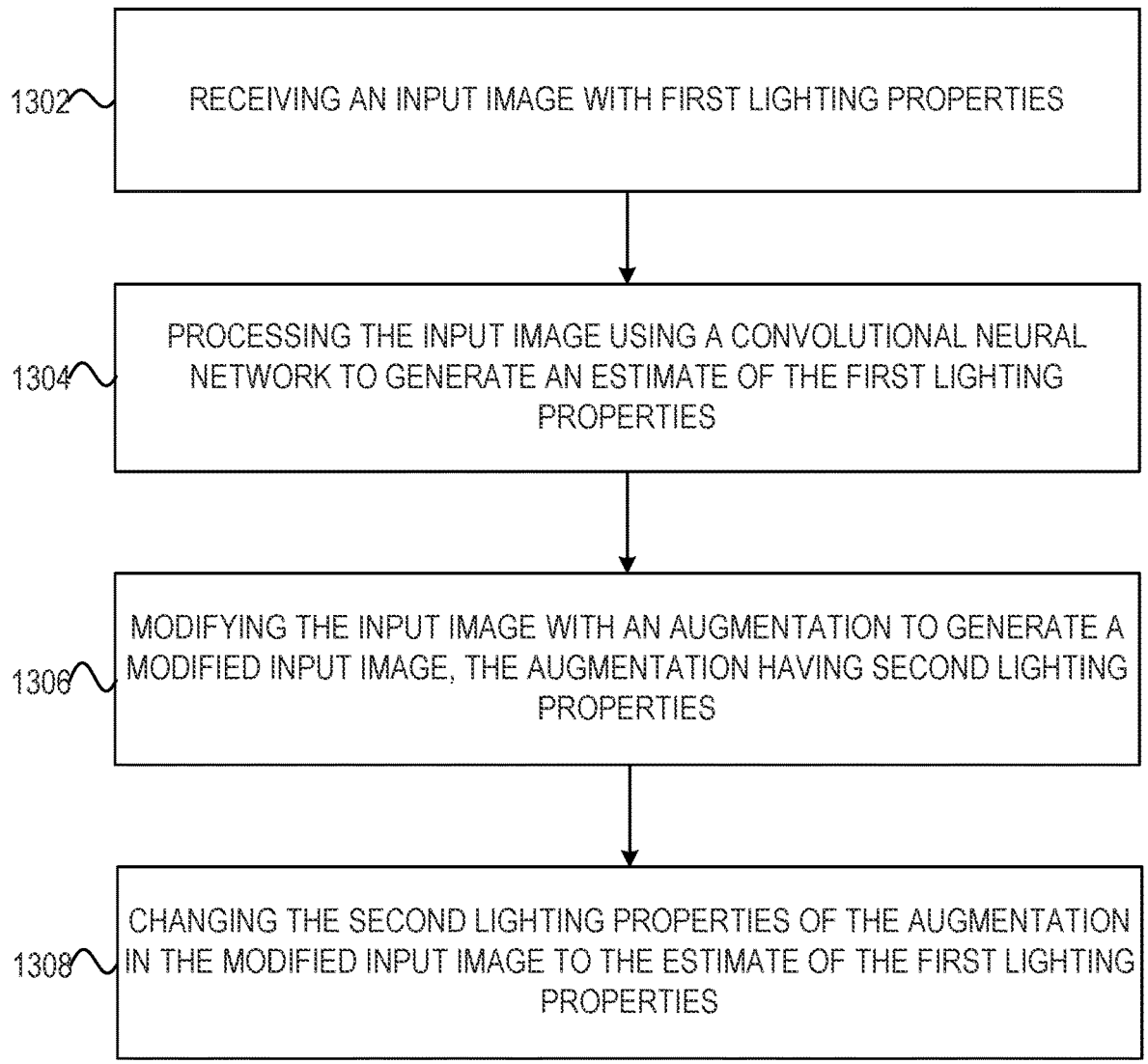
FIG. 13 illustrates a method for light estimation, in accordance with some examples.

FIG. 13 illustrates a method 1300 for light estimation, in accordance with some examples. The method 1300 begins at operation 1302 with receiving an input image with first lighting properties. For example, input image 602, 1002, 1104, or 1210 may be received by light estimation module 604 with first lighting properties 620.

The method 1300 continues at operation 1304 with processing the input image using a convolutional neural network to generate an estimate of the first lighting properties. For example, light estimation module 604 processes input image 602 to generate light estimate of first light properties 606. The light estimation module 604 is implemented with a CNN module 1004 in accordance with some examples.

The method 1300 continues at operation 1306 with modifying the input image with an augmentation to generate a modified input image, the augmentation having second lighting properties. For example, a user adds augmentation 610 to input image 602 to generate modified input image 612.

The method 1300 continues at operation 1308 with changing the second lighting properties of the augmentation in the modified input image to the estimate of the first lighting properties. For example, mask lighting module 608 changes second lighting properties 622 of augmentation 610 of modified input image 612 to third lighting properties 624 for augmentation 610 in output image 618.

One or more of the operations of method 1300 may be optional. Method 1300 may include one or more additional operations. The operations of method 1300 may be performed in a different order.

Machine Architecture

Figure 14:
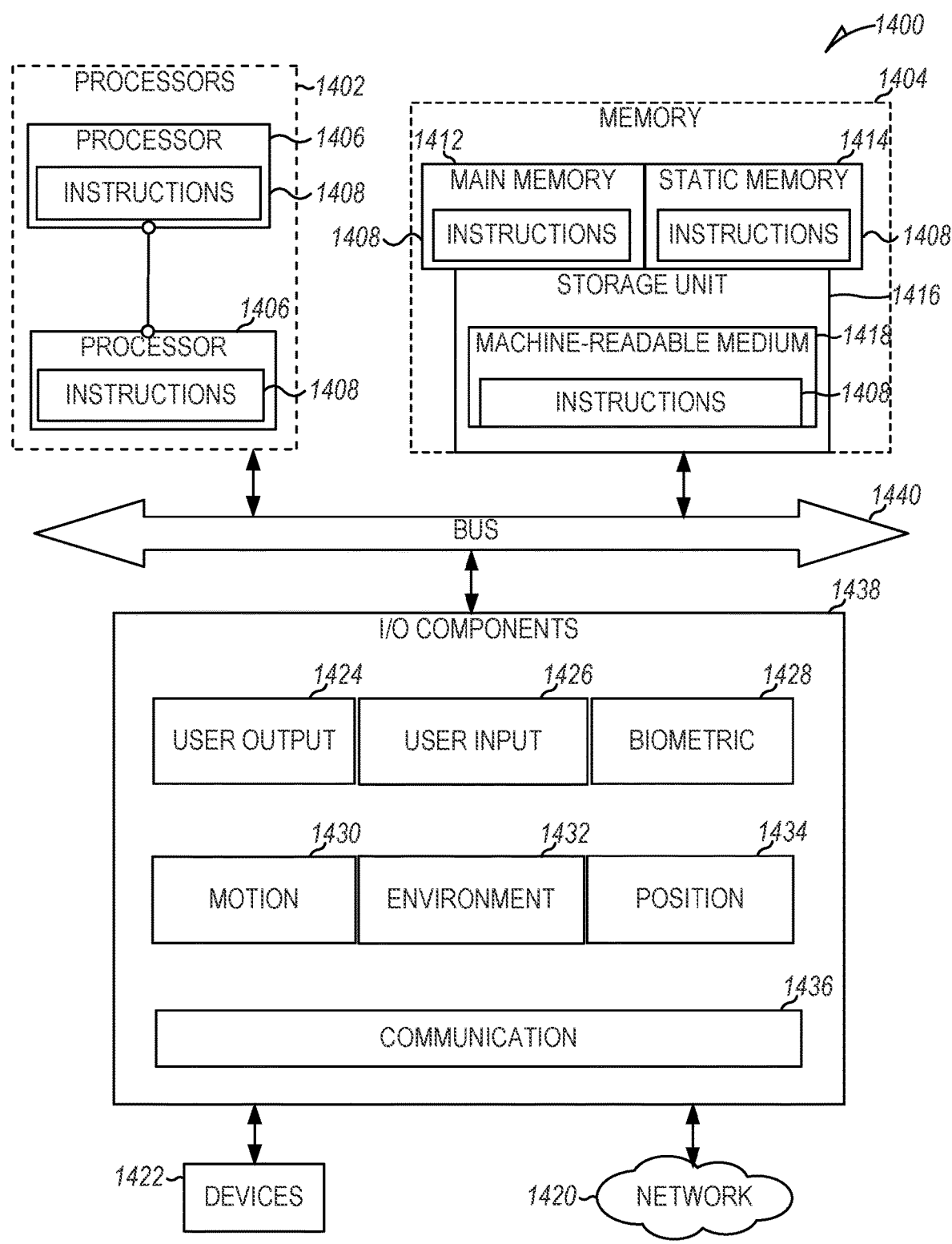
FIG. 14 is a diagrammatic representation of a machine in the form of a computer system within which a set of instructions may be executed for causing the machine to perform any one or more of the methodologies discussed herein, in accordance with some examples.

FIG. 14 is a diagrammatic representation of the machine 1400 within which instructions 1408 (e.g., software, a program, an application, an applet, an app, or other executable code) for causing the machine 1400 to perform any one or more of the methodologies discussed herein may be executed. For example, the instructions 1408 may cause the machine 1400 to execute any one or more of the methods described herein. The instructions 1408 transform the general, non-programmed machine 1400 into a particular machine 1400 programmed to carry out the described and illustrated functions in the manner described. The machine 1400 may operate as a standalone device or may be coupled (e.g., networked) to other machines. In a networked deployment, the machine 1400 may operate in the capacity of a server machine or a client machine in a server-client network environment, or as a peer machine in a peer-to-peer (or distributed) network environment. The machine 1400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1408, sequentially or otherwise, that specify actions to be taken by the machine 1400. Further, while only a single machine 1400 is illustrated, the term "machine" shall also be taken to include a collection of machines that individually or jointly execute the instructions 1408 to perform any one or more of the methodologies discussed herein. The machine 1400, for example, may comprise the client device 102 or any one of a number of server devices forming part of the messaging server system 108. In some examples, the machine 1400 may also comprise both client and server systems, with certain operations of a particular method or algorithm being performed on the server-side and with certain operations of the particular method or algorithm being performed on the client-side.

The machine 1400 may include processors 1402, memory 1404, and input/output I/O components 1438, which may be configured to communicate with each other via a bus 1440. The processors 1402 may be termed computer processors, in accordance with some examples. In an example, the processors 1402 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1406 and a processor 1402 that execute the instructions 1408. The term "processor" is intended to include multi-core processors that may comprise two or more independent processors (sometimes referred to as "cores") that may execute instructions contemporaneously. Although FIG. 14 shows multiple processors 1402, the machine 1400 may include a single processor with a single-core, a single processor with multiple cores (e.g., a multi-core processor), multiple processors with a single core, multiple processors with multiples cores, or any combination thereof.

The memory 1404 includes a main memory 1412, a static memory 1414, and a storage unit 1416, both accessible to the processors 1402 via the bus 1440. The main memory 1404, the static memory 1414, and storage unit 1416 store the instructions 1408 embodying any one or more of the methodologies or functions described herein. The instructions 1408 may also reside, completely or partially, within the main memory 1412, within the static memory 1414, within machine-readable medium 1418 within the storage unit 1416, within at least one of the processors 1402 (e.g., within the Processor's cache memory), or any suitable combination thereof, during execution thereof by the machine 1400.

The I/O components 1438 may include a wide variety of components to receive input, provide output, produce output, transmit information, exchange information, capture measurements, and so on. The specific I/O components 1438 that are included in a particular machine will depend on the type of machine. For example, portable machines such as mobile phones may include a touch input device or other such input mechanisms, while a headless server machine will likely not include such a touch input device. It will be appreciated that the I/O components 1438 may include many other components that are not shown in FIG. 14. In various examples, the I/O components 1438 may include user output components 1424 and user input components 1426. The user output components 1424 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1426 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1438 may include biometric components 1428, motion components 1430, environmental components 1432, or position components 1434, among a wide array of other components. For example, the biometric components 1428 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1430 include acceleration sensor components (e.g., accelerometer), gravitation sensor components, rotation sensor components (e.g., gyroscope).

The environmental components 1432 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detect ion sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 3600 camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera and a depth sensor, for example.

The position components 1434 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1438 further include communication components 1436 operable to couple the machine 1400 to a network 1420 or devices 1422 via respective coupling or connections. For example, the communication components 1436 may include a network interface Component or another suitable device to interface with the network 1420. In further examples, the communication components 1436 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1422 may be another machine or any of a wide variety of peripheral devices (e.g., a peripheral device coupled via a USB).

Moreover, the communication components 1436 may detect identifiers or include components operable to detect identifiers. For example, the communication components 1436 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1436, such as location via Internet Protocol (IP) geolocation, location via Wi-Fi® signal triangulation, location via detecting an NFC beacon signal that may indicate a particular location, and so forth.

The various memories (e.g., main memory 1412, static memory 1414, and memory of the processors 1402) and storage unit 1416 may store one or more sets of instructions and data structures (e.g., software) embodying or used by any one or more of the methodologies or functions described herein. These instructions (e.g., the instructions 1408), when executed by processors 1402, cause various operations to implement the disclosed examples.

The instructions 1408 may be transmitted or received over the network 1420, using a transmission medium, via a network interface device (e.g., a network interface component included in the communication components 1436) and using any one of several well-known transfer protocols (e.g., hypertext transfer protocol (HTTP)). Similarly, the instructions 1408 may be transmitted or received using a transmission medium via a coupling (e.g., a peer-to-peer coupling) to the devices 1422.

Software Architecture

Figure 15:
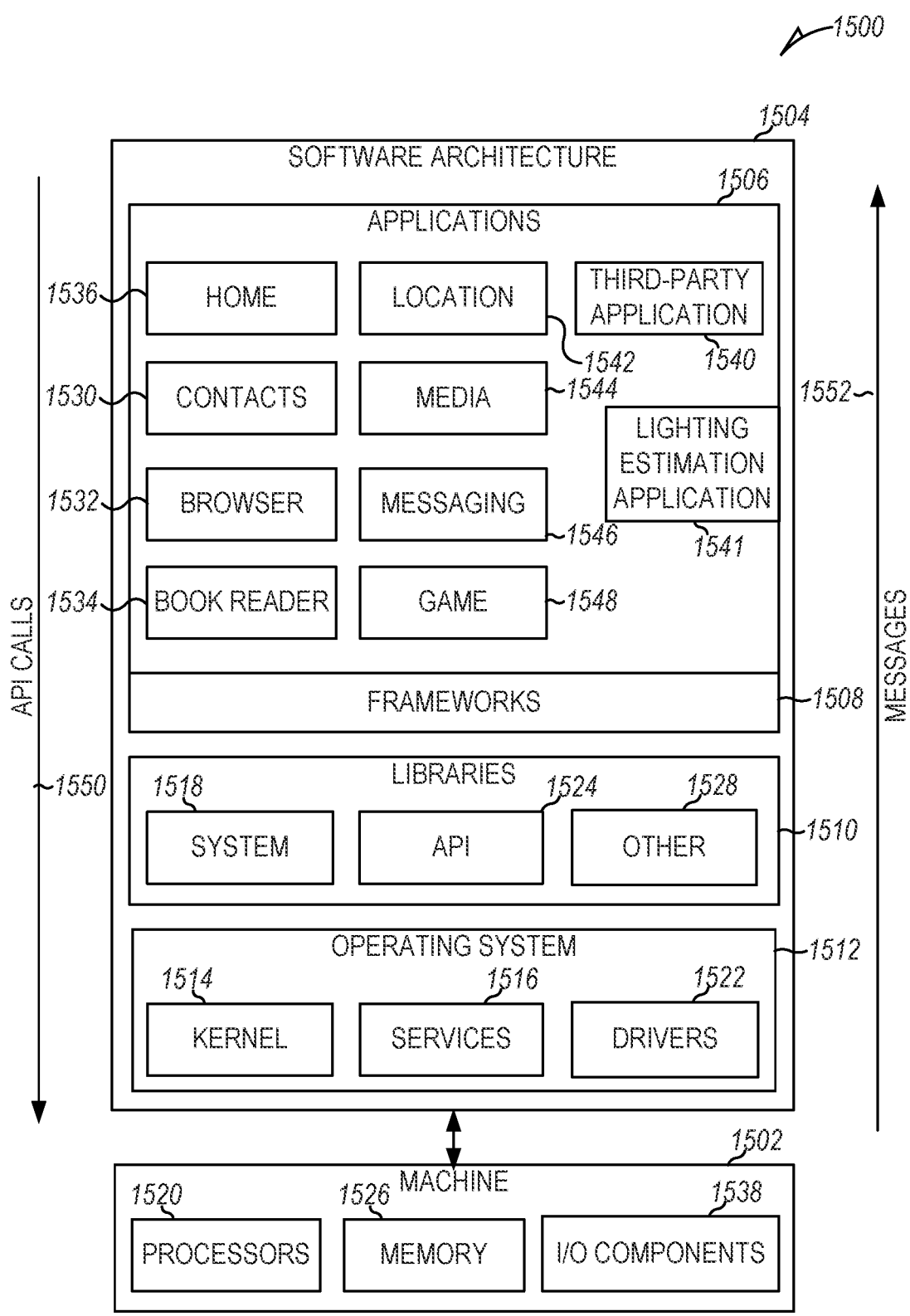
FIG. 15 is a block diagram showing a software architecture within which examples may be implemented.

FIG. 15 is a block diagram 1500 illustrating a software architecture 1504, which can be installed on any one or more of the devices described herein. The software architecture 1504 is supported by hardware such as a machine 1502 that includes processors 1520, memory 1526, and I/O components 1538. In this example, the software architecture 1504 can be conceptualized as a stack of layers, where each layer provides a particular functionality. The software architecture 1504 includes layers such as an operating system 1512, libraries 1510, frameworks 1508, and applications 1506. Operationally, the applications 1506 invoke API calls 1550 through the software stack and receive messages 1552 in response to the API calls 1550.

The operating system 1512 manages hardware resources and provides common services. The operating system 1512 includes, for example, a kernel 1514, services 1516, and drivers 1522. The kernel 1514 acts as an abstraction layer between the hardware and the other software layers. For example, the kernel 1514 provides memory management, processor management (e.g., scheduling), component management, networking, and security settings, among other functionality. The services 1516 can provide other common services for the other software layers. The drivers 1522 are responsible for controlling or interfacing with the underlying hardware. For instance, the drivers 1522 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1510 provide a common low-level infrastructure used by the applications 1506. The libraries 1510 can include system libraries 1518 (e.g., C standard library) that provide functions such as memory allocation functions, string manipulation functions, mathematic functions, and the like. In addition, the libraries 1510 can include API libraries 1524 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1510 can also include a wide variety of other libraries 1528 to provide many other APIs to the applications 1506.

The frameworks 1508 provide a common high-level infrastructure that is used by the applications 1506. For example, the frameworks 1508 provide various graphical user interface (GUI) functions, high-level resource management, and high-level location services. The frameworks 1508 can provide a broad spectrum of other APIs that can be used by the applications 1506, some of which may be specific to a particular operating system or platform.

In an example, the applications 1506 may include a home application 1536, a contacts application 1530, a browser application 1532, a book reader application 1534, a light estimation application 1541, a location application 1542, a media application 1544, a messaging application 1546, a game application 1548, and a broad assortment of other applications such as a third-party application 1540. The light estimation application 1541 may perform the operations as disclosed in conjunction with FIG. 10 and herein. The applications 1506 are programs that execute functions defined in the programs. Various programming languages can be employed to create one or more of the applications 1506, structured in a variety of manners, such as object-oriented programming languages (e.g., Objective-C, Java, or C++) or procedural programming languages (e.g., C or assembly language). In a specific example, the third-party application 1540 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1540 can invoke the API calls 1550 provided by the operating system 1512 to facilitate functionality described herein.

Processing Components

Figure 16:
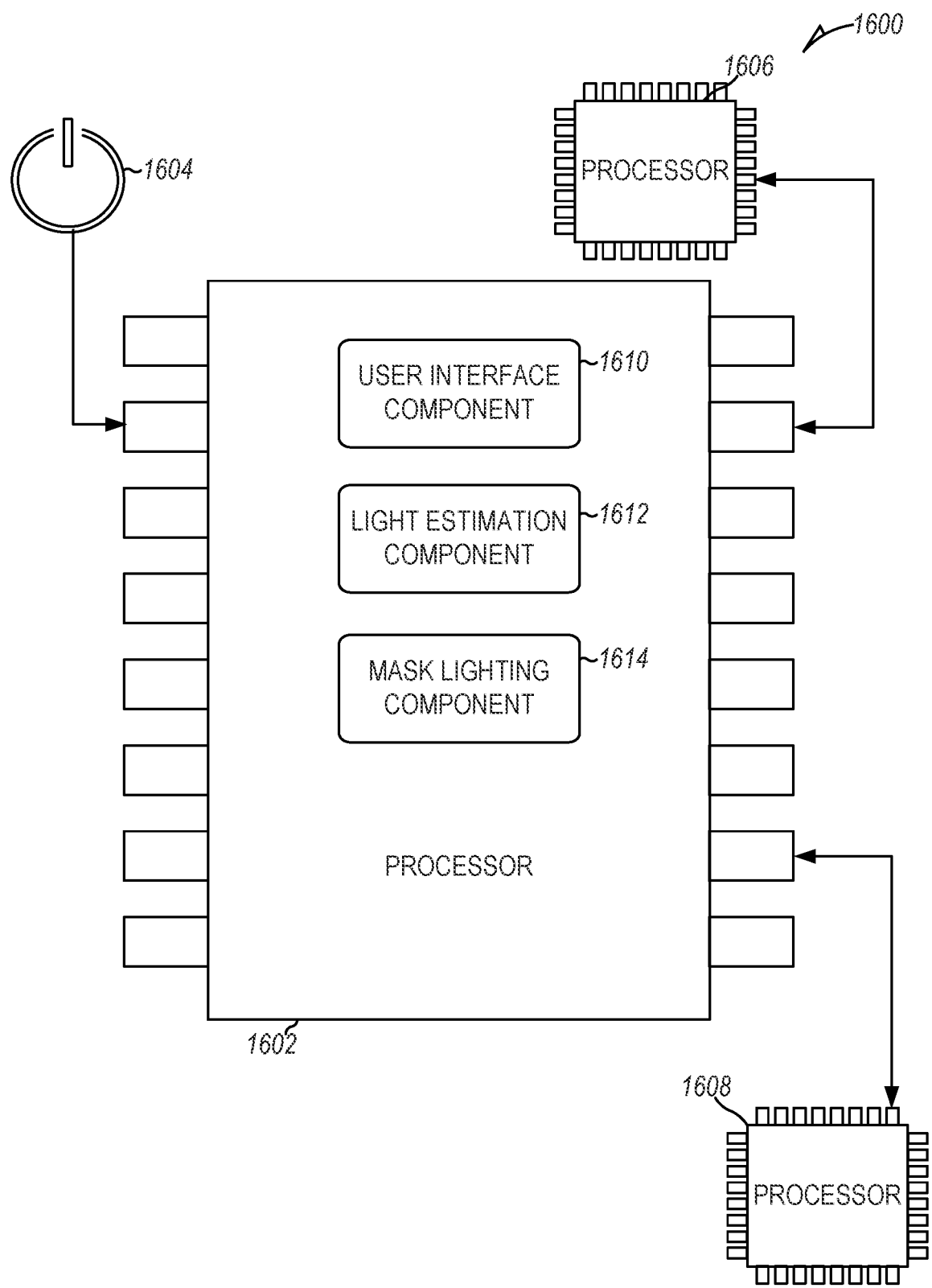
FIG. 16 is a diagrammatic representation of a processing environment, in accordance with some examples.

Turning now to FIG. 16, there is shown a diagrammatic representation of a processing environment 1600, which includes a processor 1602, a processor 1606, and a processor 1608 (e.g., a GPU, CPU or combination thereof). The processor 1602 is shown to be coupled to a power source 1604, and to include (either permanently configured or temporarily instantiated) modules, namely a user interface component 1610, a light estimation component 1612, and a mask lighting component 1614. Referring to FIG. 12, the user interface component 1610 operationally presents a user interface such as is illustrated in FIG. 12 and responds to user selections for processing input images and causes the output images to be presented or stored; referring to FIG. 10, the light estimation component 1612 takes an input image 1002 and processes the input image 1002 to generate the lighting of input image 1008 and performs one or more of the operations of method 1300; and, the mask lighting component 1614 operationally performs the operations of mask lighting module 608. As illustrated, the processor 1602 is communicatively coupled to both the processor 1606 and the processor 1608.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1402 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example examples, the processors or processor-implemented components may be located in a single geographic location (e.g., within a home environment, an office environment, or a server farm). In other example examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure. The plural of "computer-readable medium" may be termed "computer-readable mediums".

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method comprising:
   receiving an input image with first lighting properties;
   processing the input image, comprising a first plurality of pixels, using a convolutional neural network to generate a second plurality of pixels corresponding to the first plurality of pixels, the second plurality of pixels comprising an estimate of the first lighting properties, the estimate comprising estimates of at least one of: hue values, saturation values, and brightness values of the first plurality of pixels;
   modifying the input image within a region with an augmentation to generate a modified input image, the augmentation having second lighting properties; and
   changing the second lighting properties of the augmentation in the modified input image based on pixels of the second plurality of pixels corresponding to a same position within the first plurality of pixels as the region within the modified input image.

2. The method of claim 1 wherein the second lighting properties comprise at least one of: a hue value, a saturation value, and a brightness value for each pixel of a third plurality of pixels.

3. The method of claim 1 wherein the convolutional neural network is a generative adversarial network.

4. The method of claim 1, wherein before the processing the input image, the method further comprises:
   causing an adjust lighting option to be displayed on a screen; and wherein processing the input image is performed in response to receiving a selection of the adjust lighting option.

5. The method of claim 1 wherein the input image is a same size as the modified input image.

6. The method of claim 1 wherein the estimate of the first lighting properties comprises the first plurality of pixels corresponding to the input image where a color of objects within the input image are changed to a whiter color.

7. The method of claim 1 further comprising:
   generating a plurality of ground truth inputs from three-dimensional (3D) models, lighting properties, and first color conditions;
   generating a plurality of ground truth outputs from the 3D models, the lighting properties, and second color conditions; and
   training the convolutional neural network using the plurality of ground truth inputs and ground truth outputs.

8. The method of claim 7 wherein the second color conditions change the 3D models to being white.

9. The method of claim 1 wherein a pixel of the augmentation in the modified input image is changed based on a brightness of a corresponding pixel of the second plurality of pixels comprising the estimate of the first lighting properties.

10. A system comprising:
   one or more computer processors; and
   one or more computer-readable mediums storing instructions that, when executed by the one or more computer processors, cause the system to perform operations comprising:
   receiving an input image with first lighting properties;
   processing the input image, comprising a first plurality of pixels, using a convolutional neural network to generate a second plurality of pixels corresponding to the first plurality of pixels, the second plurality of pixels comprising an estimate of the first lighting properties, the estimate comprising estimates of at least one of: hue values, saturation values, and brightness values of the first plurality of pixels;
   modifying the input image within a region with an augmentation to generate a modified input image, the augmentation having second lighting properties; and
   changing the second lighting properties of the augmentation in the modified input image based on pixels of the second plurality of pixels corresponding to a same position within the first plurality of pixels as the region within the modified input image.

11. The system of claim 10 wherein the second lighting properties comprise at least one of: a hue value, a saturation value, and a brightness value for each pixel of a third plurality of pixels.

12. The system of claim 10 wherein the convolutional neural network is a generative adversarial network.

13. The system of claim 10 wherein the operations further comprise:
causing an adjust lighting option to be displayed on a screen; and wherein processing the input image is performed in response to receiving a selection of the adjust lighting option.

14. The system of claim 10 wherein the input image is a same size as the modified input image.

15. A non-transitory computer-readable storage medium including instructions that, when processed by a computer, configure the computer to perform operations comprising:
receiving an input image with first lighting properties;
processing the input image, comprising a first plurality of pixels, using a convolutional neural network to generate a second plurality of pixels corresponding to the first plurality of pixels, the second plurality of pixels comprising an estimate of the first lighting properties, the estimate comprising estimates of at least one of: hue values, saturation values, and brightness values of the first plurality of pixels;
modifying the input image within a first region with an augmentation to generate a modified input image, the augmentation having second lighting properties; and
changing the second lighting properties of the augmentation in the modified input image based on pixels of the second plurality of pixels corresponding to a same position within the first plurality of pixels as the region within the modified input image.

16. The non-transitory computer-readable storage medium of claim 15 wherein the second lighting properties comprise at least one of: a hue value, a saturation value, and a brightness value for each pixel of a third plurality of pixels.

17. The non-transitory computer-readable storage medium of claim 15 wherein the convolutional neural network is a generative adversarial network.

18. The non-transitory computer-readable storage medium of claim 15, wherein the operations further comprise:
causing an adjust lighting option to be displayed on a screen; and wherein processing the input image is performed in response to receiving a selection of the adjust lighting option.

* * * * *

UNITED STATES PATENT AND TRADEMARK OFFICE
CERTIFICATE OF CORRECTION

PATENT NO. : 12,079,927 B2  
APPLICATION NO. : 17/506248  
DATED : September 3, 2024  
INVENTOR(S) : Dmukhin et al.

Page 1 of 1

It is certified that error appears in the above-identified patent and that said Letters Patent is hereby corrected as shown below:

In the Claims

In Column 32, Line 4, in Claim 15, after "a", delete "first"

Signed and Sealed this  
Sixteenth Day of September, 2025

Coke Morgan Stewart  
*Acting Director of the United States Patent and Trademark Office*